(12) United States Patent
Hashiguchi

(10) Patent No.: US 6,308,251 B1
(45) Date of Patent: Oct. 23, 2001

(54) REDUCED POWER PARALLEL PROCESSOR APPARATUS

(75) Inventor: Akihiko Hashiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/264,500

(22) Filed: Mar. 8, 1999

(30) Foreign Application Priority Data

Mar. 10, 1998 (JP) .................................................. 10-058112

(51) Int. Cl.[7] .................................................. G06F 15/00
(52) U.S. Cl. .................. 712/16; 712/28; 712/11; 712/10; 712/22
(58) Field of Search .................. 712/28, 1, 11, 712/16, 22, 10

(56) References Cited

U.S. PATENT DOCUMENTS 5,163,120 * 11/1992 Childers et al. ................. 712/15
5,638,533 * 6/1997 Law ................................ 711/157
5,812,866 * 9/1998 Nakamura ........................ 712/1
5,838,985 * 11/1998 Ohki ............................... 712/16

* cited by examiner

Primary Examiner—Richard Hjerpe
Assistant Examiner—Mackly Monestime
(74) Attorney, Agent, or Firm—Frommer Lawrence & Haug LLP.; William S. Frommer; Joe H. Shallenburger

(57) ABSTRACT

A parallel processor apparatus capable of reducing the power consumption when converting serial data to parallel data and, at the same time, capable of improving an operating speed, wherein a data input register for converting serial data to parallel data is divided and data inputting means of a plurality of blocks are constituted and wherein detection circuits for detecting the time of input and the time of output of the pointer data in the data inputting means are provided and switch circuits for connecting the related data inputting means and a serial data input line only for a period from the time of input to the time of output of the pointer data detected by the detection circuit are provided.

15 Claims, 17 Drawing Sheets

FIG.5

| S | R | Q |
|---|---|---|
| 1 | 0 | SET STATE(1) |
| 0 | 1 | RESET STATE(0) |
| 0 | 0 | MAINTAINED PREVIOUS STATE |
| 1 | 1 | INHIBIT STATE |

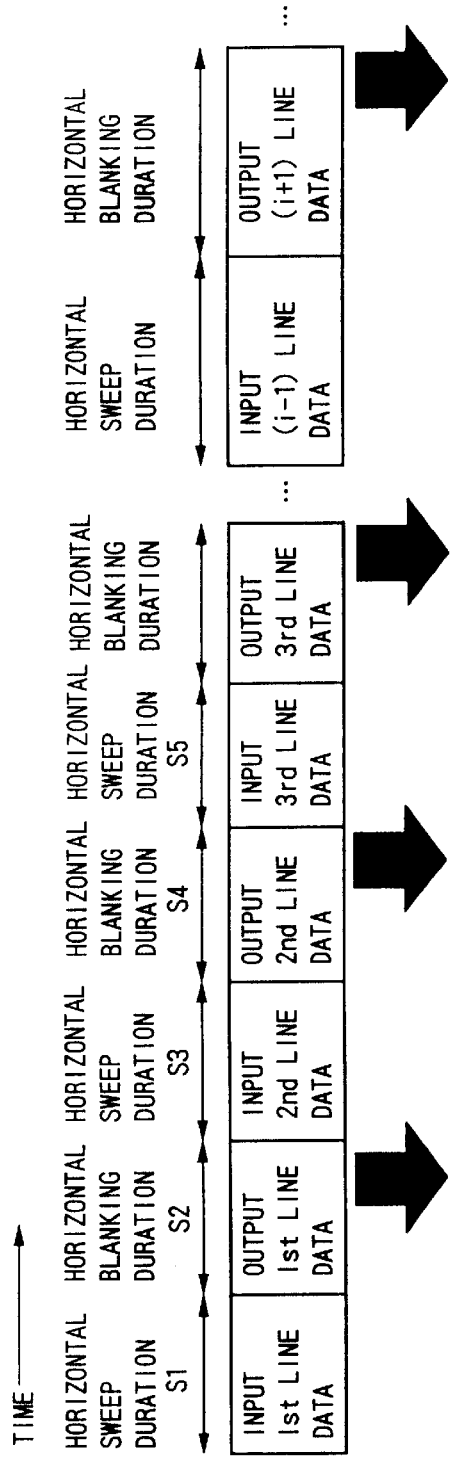
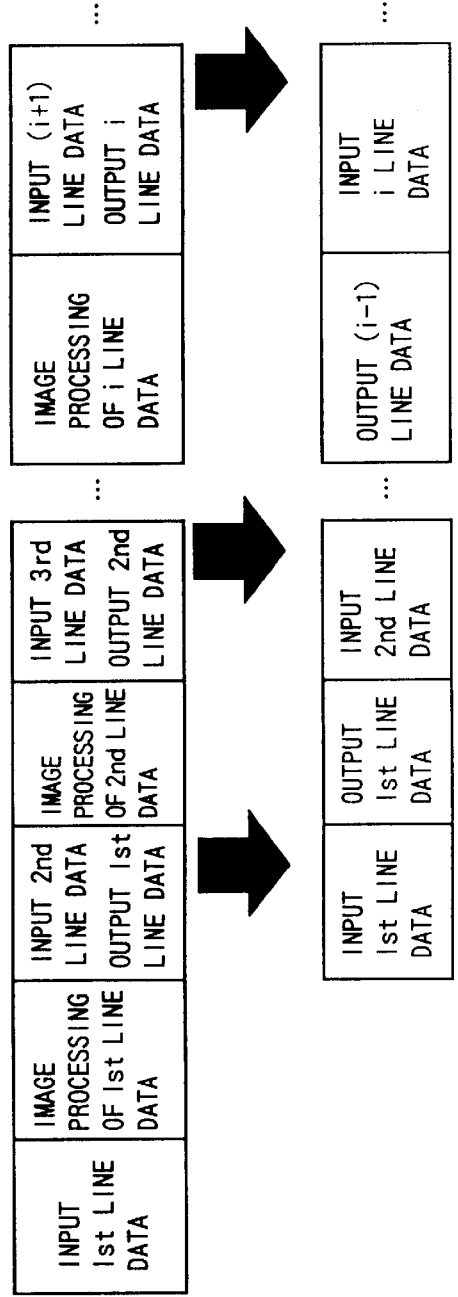
FIG.14A OPERATION OF DATA INPUT REGISTER
FIG.14B OPERATION OF PROCESSER ELEMENT
FIG.14C OPERATION OF DATA OUTPUT REGISTER

REDUCED POWER PARALLEL PROCESSOR APPARATUS

BACKGROUND OF THE INVENTION

1. Field of the Invention

The present invention relates to a parallel processor apparatus, more particularly relates to a parallel processor apparatus capable of reducing the power consumption and improving the operating speed when converting serial data to parallel data or when converting parallel data to serial data.

2. Description of the Related Art

Where digitally processing image data, there are many cases in which similar processing is applied to all of the pixel data composing an image.

In order to execute similar processing with respect to a plurality of data at a high speed, a parallel processor apparatus adopting a single instruction multiple data stream (SIMD) type architecture has been proposed. This is being utilized in a wide range of fields not limited to image data processing.

In an SIMD type architecture, exactly the required number of processor elements are arranged. Each processor element operates according to the same command.

Accordingly, when different data are simultaneously given to the processor elements, the results of processing with respect to the individual data are simultaneously obtained. As a parallel processor apparatus adopting such an SIND type architecture applied to image data processing, there is for example known the parallel processor apparatus shown in SVP (SERIAL VIDEO PROCESSOR, Proceedings of the IEEE 1990 CUSTOM INTEGRATED CIRCUITS CONFERENCE, p. 17, 3.1 to 4).

This parallel processor apparatus, as shown in for example FIG. 11, is provided with a data input register 102, processor elements (PE) $3_1$ to $3_n$ and a data output register 104.

Here, the data input register 102 sequentially receives as input one sweep line's worth of pixel data as serial data $S_{IN}$ and outputs the one sweep line's worth of pixel data to the individual processor elements $3_1$ to $3_n$. The processor elements $3_1$ to $3_n$ respectively process the one sweep line's worth of pixel data in parallel. The data output register 104 receives as input the processed one sweep line's worth of pixel data in parallel from the processor elements $3_1$ to $3_n$ and sequentially outputs the same as the serial data $S_{OUT}$.

The routine for processing image data composed by pixel data of m×n number of pixels p(1,1) to p(m,n) arranged in the form of a matrix as shown in FIG. 12 in such a parallel processor apparatus 101 will be explained below by referring to FIGS. 14A to 14C.

Here, the pixel data of the pixel p(i,j) of any i,j (where $1 \leq i \leq m$, $1 \leq j \leq n$) can be expressed by using a plurality of bits.

In FIG. 12, pixels are usually swept in order from the left to the right and from the top to Ebottom, therefore the image data are generally transmitted in the format as shown in FIG. 13. Here, the period for sweeping one line's worth of pixel data will be referred to as a "horizontal sweep duration". Further, the period for the sweep to return from a right end of a certain line of the screen to a left end of a next line will be referred to as a "horizontal blanking duration". For example, there is a horizontal blanking duration between the pixel p(i,n) of the right end of an i-th line and the pixel p(i+1,1) of the left end of the next line.

In FIGS. 14A to 14C, for example, image data comprised of pixel data composed in turn of a plurality of bits are sequentially input to the input terminals of the processor elements in units of the pixel data. The pixel data of the first line are stored in a data input register 102 shown in FIG. 11 having a storage capacity of one line's worth of the image data in a first horizontal sweep duration (S1). Then, the pixel data of the first line stored in the data input register 102 are sequentially output to the processor elements $3_1$ to $3_n$ within the next horizontal blanking duration (S2) so that one pixel's worth of the pixel data is supplied to one processor element.

Next, in the horizontal sweep duration (S3), a each of the processor elements $3_1$ to $3_n$ performs processing with respect to the supplied one line's worth of the pixel data. Further, simultaneously with this, pixel data of the second line are sequentially input to the data input register 102. Then, within the succeeding horizontal blanking duration (S4), the processed pixel data of the first line are supplied from the processor elements $3_1$ to $3_n$ to the data output register 104 in parallel. Simultaneously with this, the pixel data of the second line are supplied from the data input register 102 to the processor elements $3_1$ to $3_n$ in parallel. Then, in the next horizontal sweep duration (S5), the pixel data of the first line stored in the data output register 104 are sequentially output to the output terminals of the processor elements. Simultaneously with this, the processor elements $3_1$ to $3_n$ process the pixel data of the second line, and the pixel data of a third line are sequentially input to the data input register 102.

After this, when the processor elements $3_1$ to $3_n$ process the pixel data of the i-th line, the operation of the data input register 102 receiving as input the pixel data of the (i+1)th line and the data output register 104 outputting the pixel data of the (i−1)th line is repeated. In this way, the data input register 102, the processor elements $3_1$ to $3_n$, and the data output register 104 operate in synchronization, whereby image data processed for every horizontal sweep duration is output.

Below, a detailed explanation will be given of the data input register 102.

As shown in FIG. 15, the data input register 102 is constituted by a pointer circuit 105 and a conversion circuit 6.

The pointer circuit 105 can be constituted by using a shift register widely used when performing mutual conversion of serial data and parallel data. The pointer circuit 105 is structured with the unit delay elements $26_1$ to $26_n$ such as D-type flip-flops connected in series, receives as its input a pointer control signal S1 comprised by a clock signal S11 and pointer data S12, and outputs pointer data $S26_1$ to $S26_n$ to the conversion circuit 6.

The conversion circuit 6 has arranged in parallel first switching means $30_1$ to $30_n$, memories $31_1$ to $31_n$ and second switching means $32_1$ to $32_n$, receives as its inputs serial data $S_{IN}$, pointer data $S26_1$ to $S26_n$, and a switch control signal S9, and outputs parallel data S6 comprised by data $S6_1$ to $S6_n$ to the processor elements $3_1$ to $3_n$.

Here, the signal line of the serial data $S_{IN}$ and the signal lines of the parallel data S6 have widths or numbers of bits sufficient for expressing the data of one pixel.

The operation of the data input register 102 will be explained next by referring to FIGS. 16A to 16C.

In the conversion circuit 6, among the switching means $30_1$ to $30_n$, the switching means $30_x$ with a logic "1" of the pointer data $S26_1$ to $S26_n$ become an ON state and store the corresponding pixel data among the sequentially input serial data $S_{IN}$ in the memory $31_x$. Namely, in synchronization with the logical value "1" being given to the pointer data S12 for only a first clock cycle in the horizontal sweep duration and a pulse being given to the clock signal S11. If the pixel data of the pixels p(i,1) to p(i,n) of for example the i-th line are sequentially given as the serial data $S_{IN}$, one line's worth of pixel data is respectively stored in the memories $31_1$ to $31_n$.

First, the pointer data $S26_1$ indicates the logical value "1", as shown in FIG. 16A, the switching means $30_1$ becomes the ON state, and the pixel data of the pixel p(i,1) is stored in the memory $31_1$. At this time, the pointer data $S26_2$ to $S26_n$ indicate a logical value "0", and the switching means $30_2$ to $30_n$ become an OFF state.

Next, the pointer data $S26_2$ indicates the logical value "1", as shown in FIG. 16B, the switching means $30_2$ becomes the ON state, and the pixel data of the pixel p(i,2) is stored in the memory $31_2$. At this time, the pointer data $S26_1$ and $S26_3$ to $S26_n$ indicate the logical value "0", and the switching means $30_1$ and $30_3$ to $30_n$ become the OFF state.

Further, the pointer data $S26_3$ to $S26_{n-1}$ sequentially indicate the logical value "1". After going through similar processing, the pixel data of pixels p(i,3) to p(i,n-1) are respectively sequentially stored in the memories $31_3$ to $31_{n-1}$.

Finally, the pointer data $S26_n$ indicates the logical value "1", as shown in FIG. 16C, the switching means $30_n$ becomes the ON state, and the pixel data of the pixel p(i,n) is stored in the memory $31_n$.

Next, in the blanking duration, the switch control signal S9 shown in FIG. 15 becomes the logical value "1", the switching means $32_1$ to $32_n$ simultaneously switch to the ON state, and the pixel data $S6_1$ to $S6_n$ stored in the memories $31_1$ to $31_n$ are output to the processor elements $3_1$ to $3_n$ in parallel.

The data output register 104 will be explained next in detail.

As shown in FIG. 17, the data output register 104 is constituted by a pointer circuit 109 and a conversion circuit 10.

The pointer circuit 109 is structured with the unit delay elements $37_1$ to $37_n$ such as D-type flip-flops connected in series, receives as its input a pointer control signal S3 comprised by a clock signal S31 and pointer data $S32_1$ and outputs pointer data $S37_1$ to $S37_n$ to the conversion circuit 10.

The pointer circuit 109 is constituted by using a shift register widely used at the time of mutual conversion of serial data and parallel data.

The conversion circuit 10 has arranged in parallel switching means $35_1$ to $35_n$, memories $36_1$ to $36_n$, and switching means $38_1$ to $38_n$, receives as its inputs parallel data S3 comprised of data $S3_1$ to $S3_n$, pointer data $S37_1$ to $S37_n$ and the switch control signal S39, and outputs the serial data $S_{OUT}$.

The operation of the data output register 104 will be explained next by referring to FIG. 17 and FIGS. 18A to 18C. In the processor elements $3_1$ to $3_n$ shown in FIG. 11, when the processing of the pixel data is terminated, in the horizontal blanking duration, the switch control signal S39 becomes the logical value "1", and the switching means $38_1$ to $38_n$ become the ON state. By this, the pixel data processed in the processor elements $3_1$ to $3_n$ are simultaneously stored in the memories $36_1$ to $36_n$.

Among the pointer data $S37_1$ to $S37_n$ from the pointer circuit 109 in the horizontal sweep duration, the switches $35_1$ to $35_n$ receiving as their inputs the pointer data which have become the logical value "1" become the ON state, and the pixel data stored in the corresponding memories $36_1$ to $36_n$ are output as the serial data $S_{OUT}$.

If the logical value "1" is given to the pointer data S32 for only the first clock cycle of the horizontal sweep duration, and the pulse is given to the clock signal S31, the switching means $35_1$ to $35_n$ sequentially become the ON state only for one clock cycle in synchronization with this, and the pixel data stored in the memories $36_1$ to $36_n$ are output as the serial data $S_{OUT}$.

Specifically, when the pulses of one line's worth of pixels are given to the clock signal $S31_1$ the pixel data of the pixels q(i,1) to q(i,n) of for example the i-th line are output from the memories $36_1$ to $36_n$ as the serial data $S_{out}$. Note that the pointer circuit 105 of the data input register 102 and the pointer circuit 109 of the data output register 104 have the same circuit configuration.

As explained by referring to FIG. 15 and FIGS. 16A to 16C, the memory to which the pixel data are actually input in the conversion circuit 6 of the data input register 102 is only one of the memories $31_1$ to $31_n$ corresponding to one of the pointer data $S26_1$ to $S26_n$ having the logical value "1". The serial data input line for transmitting the serial data $S_{IN}$ is connected to all switches $30_1$ to $30_n$, therefore, due to an influence of a parasitic capacitance accompanying the switches $30_1$ to $30_n$, the power consumption of the data input register 102 is increased, and the operating speed is lowered.

Further, as explained by referring to FIG. 17 and FIGS. 18A to 18C, the memory to which the pixel data are actually input in the conversion circuit 10 of the data output register 104 is only one of the memories $36_1$ to $36_n$ corresponding to one of the pointer data $S37_1$ to $S37_n$ having the logical value "1". The serial data output line for transmitting the serial data $S_{OUT}$ is connected to all switches $35_1$ to $35_n$, therefore, due to the influence of the parasitic capacitance accompanying the switches $35_1$ to $35_n$, the power consumption of the data output register 104 is increased, and the operating speed is lowered.

SUMMARY OF THE INVENTION

An object of the present invention is to provide a parallel processor apparatus capable of reducing the power consumption when converting serial data to parallel data and, at the same time, capable of improving the operating speed.

Another object of the present invention is to provide a parallel processor apparatus capable of reducing the power consumption when converting parallel data to serial data and, at the same time, capable of improving the operating speed.

According to a first aspect of the present invention, there is provided a parallel processor apparatus comprised of data inputting means of a plurality of blocks each comprised of a shift register comprised of a plurality of first storage means connected in series so that pointer data is input to a first storage means of a first stage and so that the output of a first storage means of a previous stage is input to the first storage means of a latter stage, a plurality of second storage means provided corresponding to the plurality of first storage means, and a plurality of switching means provided corresponding to the plurality of first storage means and supplying one partial data in a plurality of partial data constituting serial data to the corresponding second storage means at a timing corresponding to the output from the corresponding first storage means; a plurality of processing means provided corresponding to the plurality of second storage means and performing processing using the partial data stored in the corresponding second storage means; a detection circuit for detecting the input timing and output timing of pointer data in the data inputting means; and a switch circuit for connecting the data inputting means and serial data input line only in the period from the input to output of the pointer data detected by the detection circuit.

Preferably, the detection circuit is provided with a set-reset type flip-flop; the flip-flop is configured to make the output level of the flip-flop one level when the pointer data is input to the data inputting means and to make the output level of the flip-flop another level when the pointer data is output from the data inputting means; and the switch circuit connects the data inputting means and the serial data input line when the output level of the flip-flop is the one level.

Preferably, the detection circuit is configured using a charge-discharge circuit which makes the output level one level by charging when the pointer data is input to the data inputting means and makes the output level another level by discharging when the pointer data is output from the data inputting means; and the switch circuit connects the data inputting means and the serial data input line when the output level of the charge-discharge circuit is the one level.

Preferably, the number of the detection circuits is equal to the number of the data inputting means.

Preferably, the serial data is image data and the partial data is image data.

According to a second aspect of the present invention, there is provided a parallel processor apparatus comprised of a plurality of processing means; data outputting means of a plurality of blocks each comprised of a shift register comprised of a plurality of first storage means connected in series so that pointer data is input to a first storage means of a first stage and so that the output of the first storage means of a previous stage is input to the first storage means of a latter stage, a plurality of second storage means provided corresponding to the plurality of processing means and receiving as input and storing the results of processing from the corresponding processing means, and a plurality of switching means provided corresponding to the plurality of first storage means and supplying the results of processing from the corresponding second storage means at a timing corresponding to the output from the corresponding first storage means; a detection circuit for detecting the input timing and output timing of pointer data in the data outputting means; and a switch circuit for connecting the data outputting means and serial data output line only in the period from the input to output of the pointer data detected by the detection circuit.

Preferably, the detection circuit is provided with a set-reset type flip-flop; the flip-flop is configured to make the output level of the flip-flop one level when the pointer data is input to the data outputting means and to make the output level of the flip-flop another level when the pointer data is output from the data outputting means; and the switch circuit connects the data outputting means and the serial data output line when the output level of the flip-flop is the one level.

Preferably, the detection circuit is configured using a charge-discharge circuit which makes the output level one level by charging when the pointer data is input to the data outputting means and makes the output level another level by discharging when the pointer data is output from the data outputting means; and the switch circuit connects the data outputting means and the serial data output line when the output level of the charge-discharge circuit is the one level.

Preferably, the number of the detection circuits is equal to the number of the data outputting means.

Preferably, the serial data is image data and the partial data is image data.

According to a third aspect of the present invention, there is provided a parallel processor apparatus comprised of data inputting means of a plurality of blocks each comprised of a shift register comprised of a plurality of first storage means connected in series so that first pointer data is input to a first storage means of a first stage and so that the output of a first storage means of a previous stage is input to the first storage means of a latter stage, a plurality of second storage means provided corresponding to the plurality of first storage means, a plurality of first switching means provided corresponding to the plurality of first storage means and supplying one partial data in a plurality of partial data constituting serial data to the corresponding second storage means at a timing corresponding to the output from the corresponding first storage means; a plurality of processing means provided corresponding to the plurality of second storage means and for performing processing using the partial data stored in the corresponding second storage means; data outputting means of a plurality of blocks each comprising a shift register comprised of a plurality of third storage means connected in series so that second pointer data is input to a third storage means of a first stage and so that the output of a third storage means of a previous stage is input to the third storage means of a latter stage, a plurality of fourth storage means provided corresponding to the plurality of processing means and receiving as input and storing the results of processing from the corresponding processing means, and a plurality of second switching means provided corresponding to the plurality of third storage means and outputting the results of processing from the corresponding fourth storage means to the serial data output line at a timing corresponding to the output from the corresponding third storage means to generate serial data; a first detection circuit for detecting the input timing and output timing of the first pointer data at the data inputting means; a first switching means for connecting the data inputting means and serial data input line only in the period from the input to output of the first pointer data detected by the first detection circuit; a second detection circuit for detecting the input timing and output timing of the second pointer data at the data outputting means; and a second switching means for connecting the data outputting means and serial data output line only in the period from the input to output of the second pointer data detected by the second detection circuit.

Preferably, the first detection circuit is provided with a set-reset type first flip-flop; the first flip-flop is configured to make the output level of the first flip-flop one level when the first pointer data is input to the data inputting means and to make the output level of the first flip-flop another level when the first pointer data is output from the data inputting means; the second detection circuit is provided with a set-reset type second flip-flop; the first switch circuit connects the data inputting means and the serial data input line when the output level of the first flip-flop is the one level; the second flip-flop is configured to make the output level of the second flip-flop one level when the second pointer data is input to the data inputting means and to make the output level of the second flip-flop another level when the second pointer data is output from the data inputting means; and the second switch circuit connects the data outputting means and the serial data output line when the output level of the second flip-flop is the one level.

Preferably, the first detection circuit is configured using a first charge-discharge circuit which makes the output level one level by charging when the first pointer data is input to the data inputting means and makes the output level another level by discharging when the first pointer data is output from the data inputting means; the first switch circuit connects the data inputting means and the serial data input line when the output level of the first charge-discharge circuit is the one level; the second detection circuit is configured using a second charge-discharge circuit which makes the output level one level by charging when the second pointer data is input to the data inputting means and makes the output level another level by discharging when the second pointer data is output from the data inputting means; and the second switch circuit connects the data outputting means and the serial data output line when the output level of the second charge discharge circuit is the one level.

Preferably, the number of the first detection circuits is equal to the number of the data inputting means and the number of the second detection circuits is equal to the number of the data outputting means.

Preferably, the serial data is image data and the partial data is image data.

BRIEF DESCRIPTION OF THE DRAWINGS

The above object and features of the present invention will be more apparent from the following description of the preferred embodiments given with reference to the accompanying drawings, in which:

FIG. 5 is a truth table of a set-reset type flip-flop;

FIGS. 14A to 14C are views for explaining a routine when processing the image data shown in FIG. 12 by a parallel processor apparatus;

DESCRIPTION OF THE PREFERRED EMBODIMENTS

Below, an explanation will be made of a parallel processor apparatus according to an embodiment of the present invention.

Figure 1:
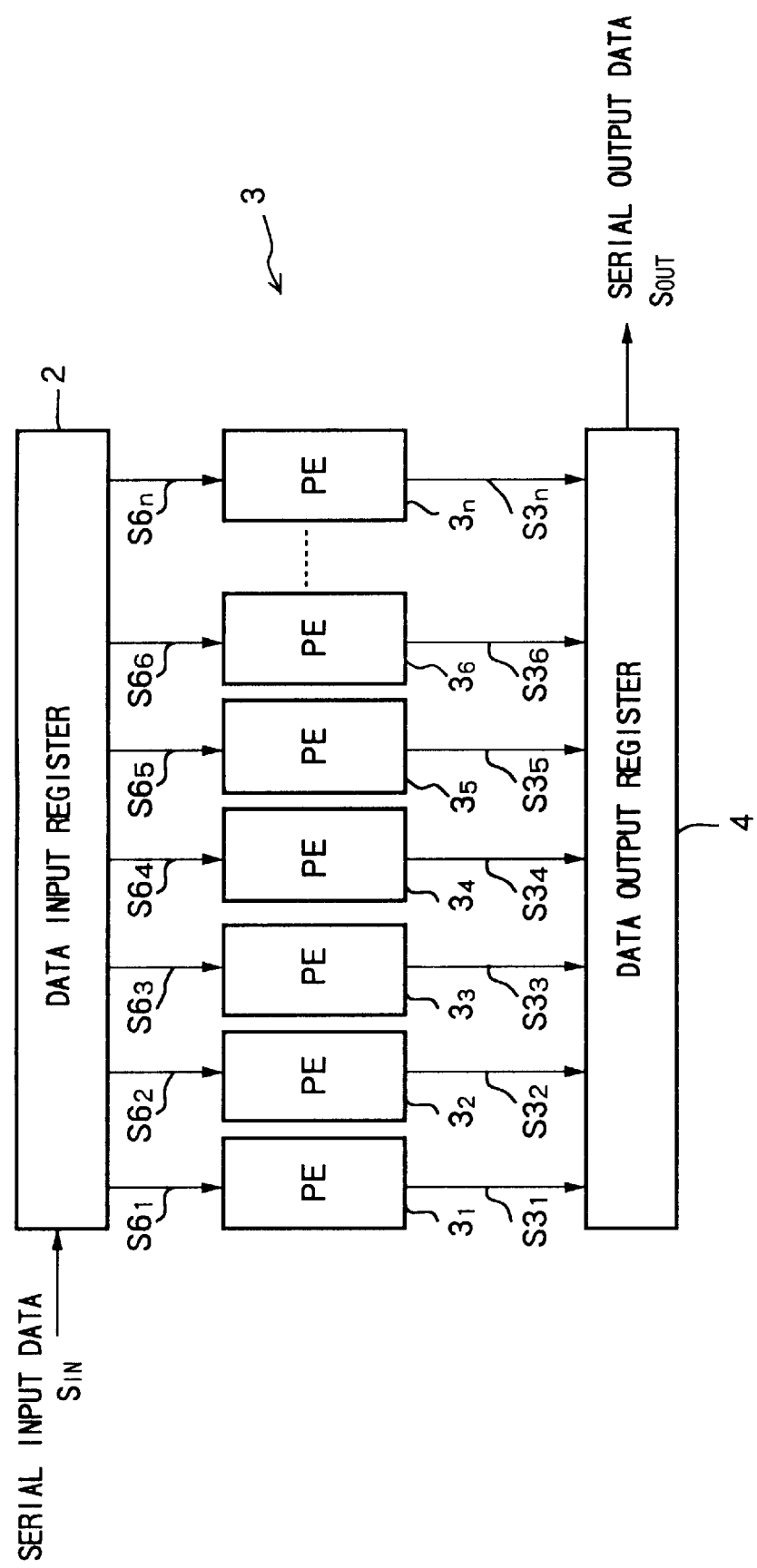
FIG. 1 is a view of the configuration of a parallel processor apparatus according to an embodiment of the present invention.

FIG. 1 is a view of the configuration of a parallel processor apparatus 1 according to the embodiment of the present invention.

As shown in FIG. 1, the parallel processor apparatus 1 is provided with a data input register 2, processor elements $3_1$ to $3_n$ and the data output register 4 and adopts an SIMD type architecture for handling a plurality of data streams by a single command.

Figures 11, 12:
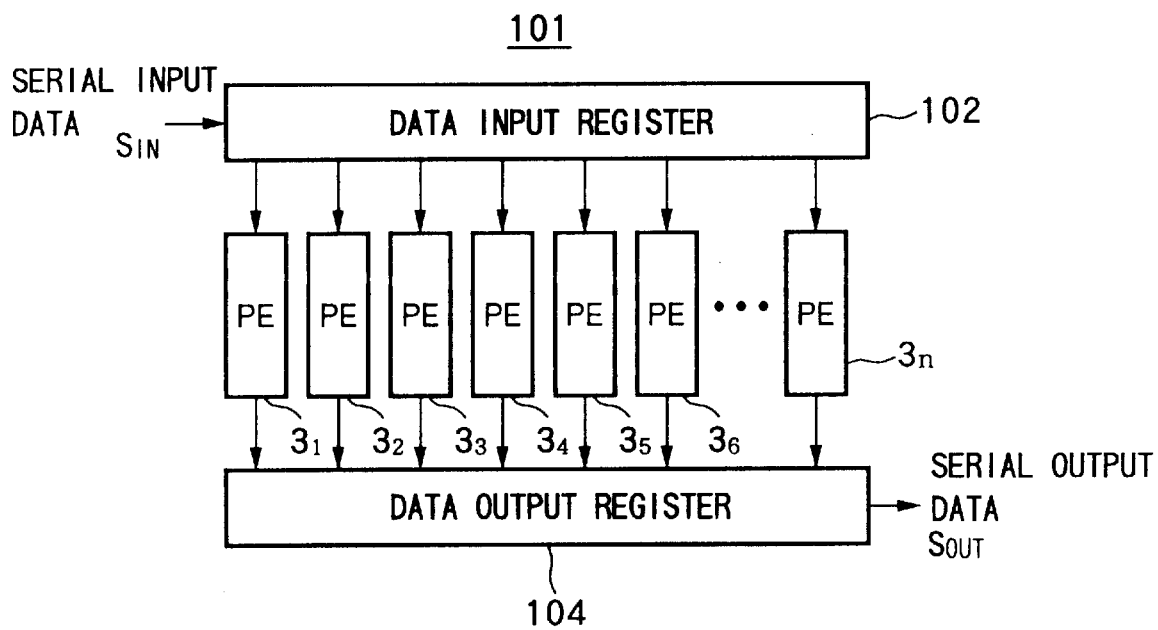
FIG. 11 is a view of the general configuration of a parallel processor apparatus.
FIG. 12 is a view of the configuration of the image data covered by the processing of the parallel processor apparatus illustrated in FIG. 11.
Figure 13:
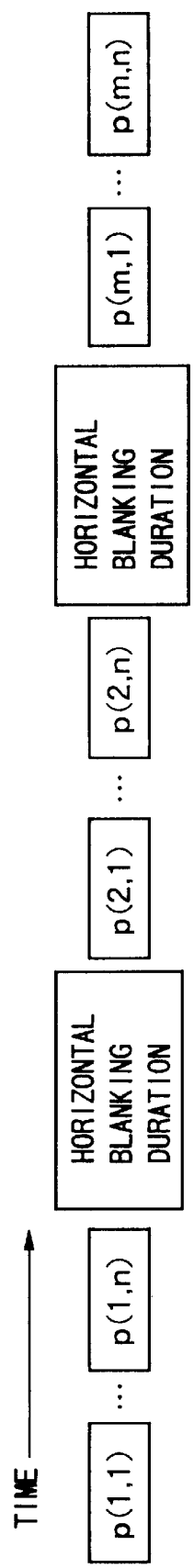
FIG. 13 is a view for explaining a general transmission format of the image data shown in FIG. 12.
Figure 15:
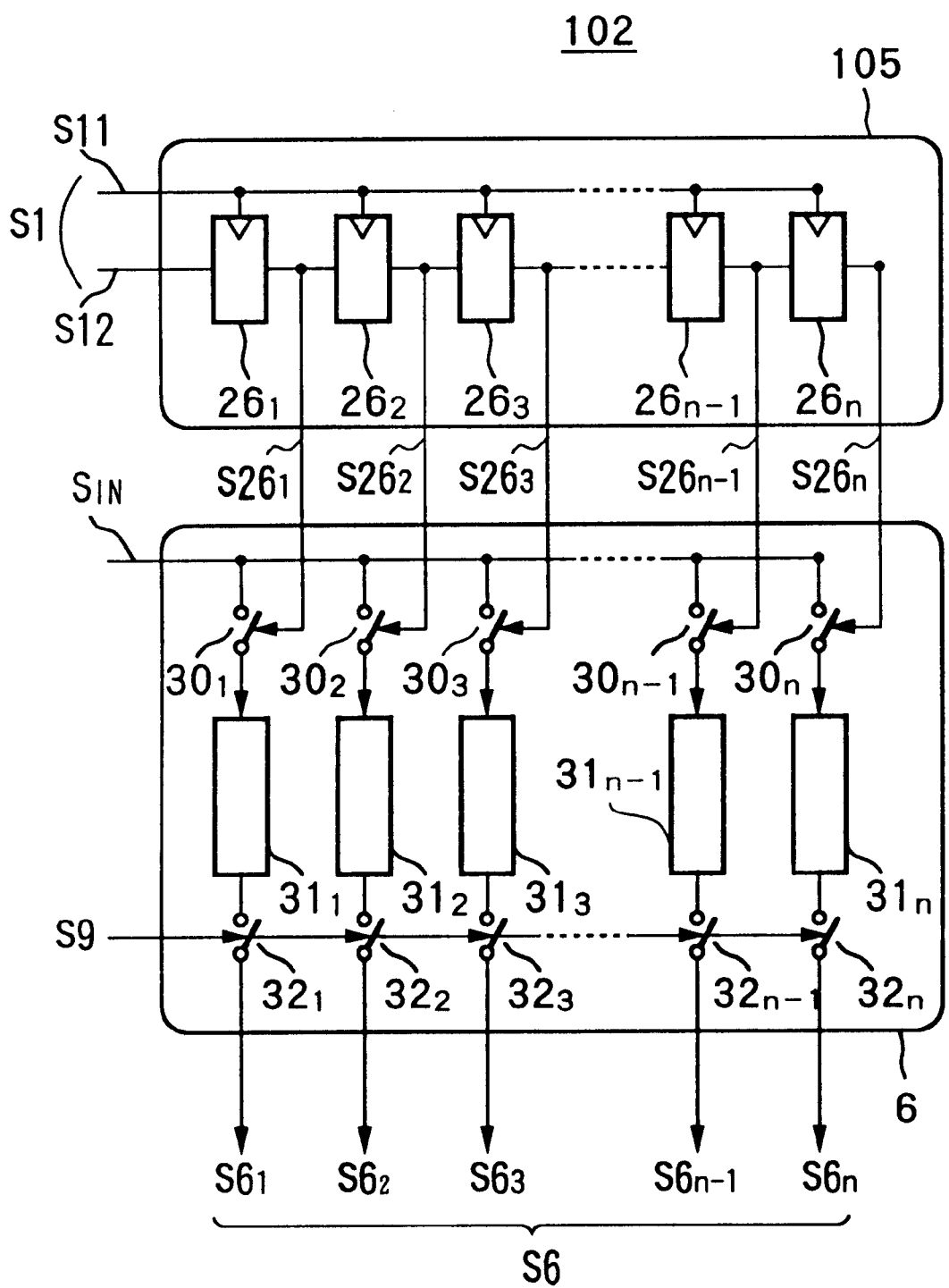
FIG. 15 is a simple view of the configuration of the data input register of the parallel processor apparatus shown in FIG. 11.
Figure 16A:
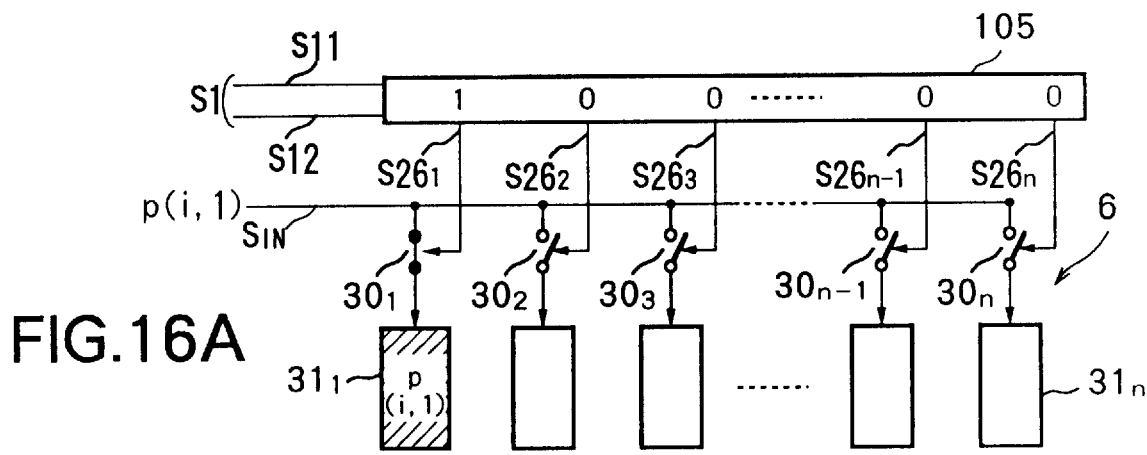
FIGS. 16A to 16C are views for explaining the operation of the data input register shown in FIG. 15.
Figure 16B:
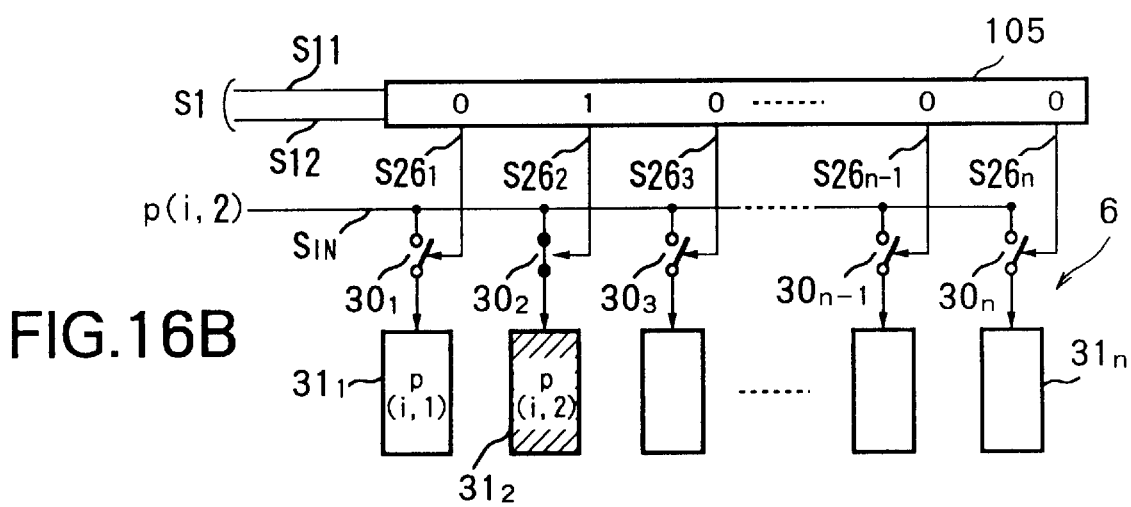
Figure 16C:
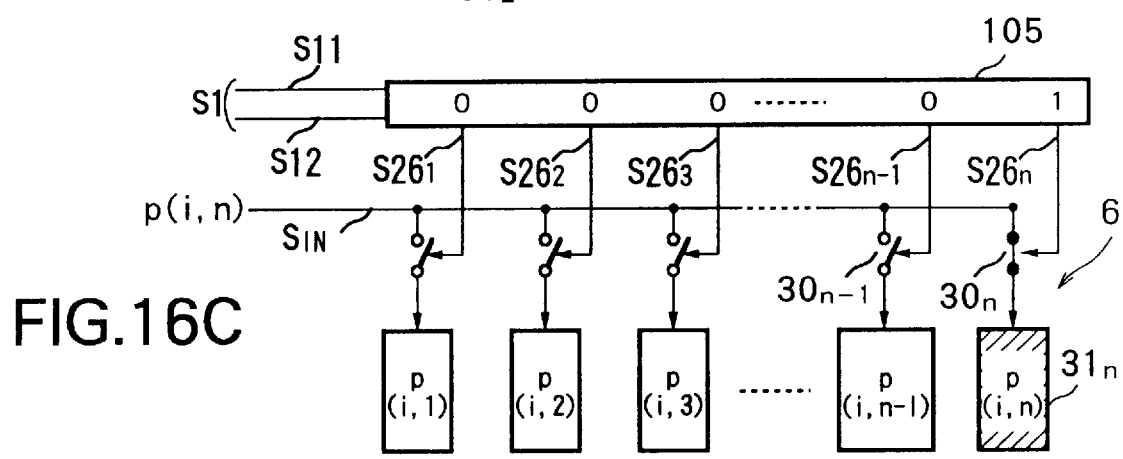
Figure 17:
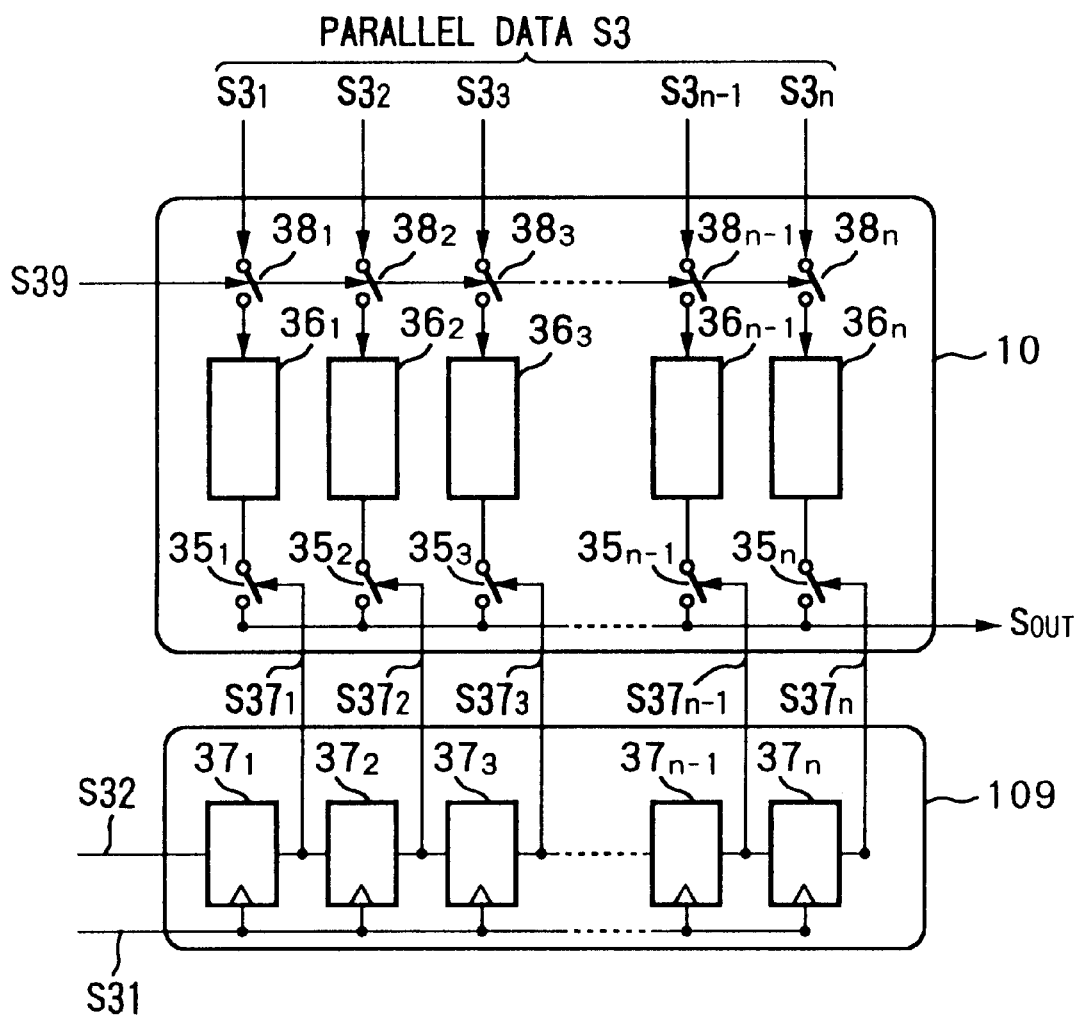
FIG. 17 is a view of the configuration of the data output register of the parallel processor apparatus shown in FIG. 11.
Figure 18A:
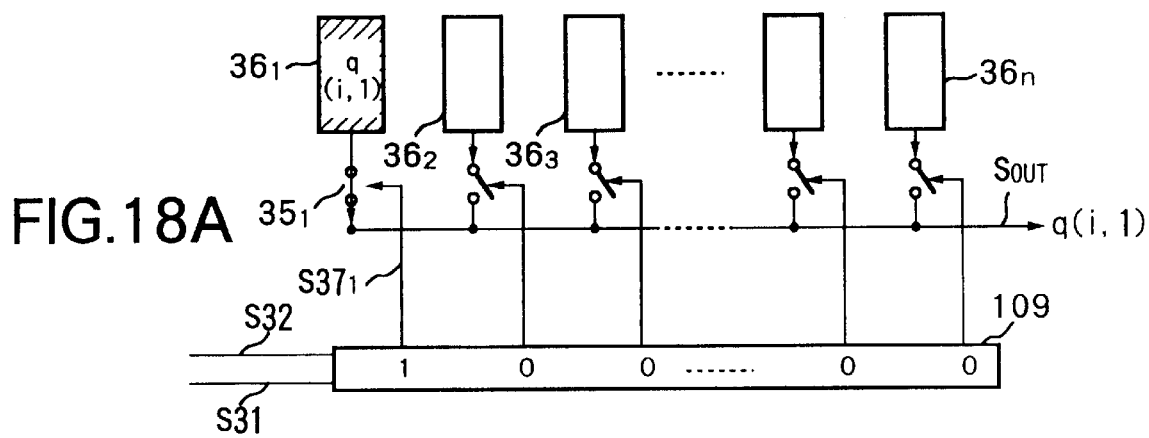
FIGS. 18A to 18C are views for explaining the data output register shown in FIG. 17.
Figure 18B:
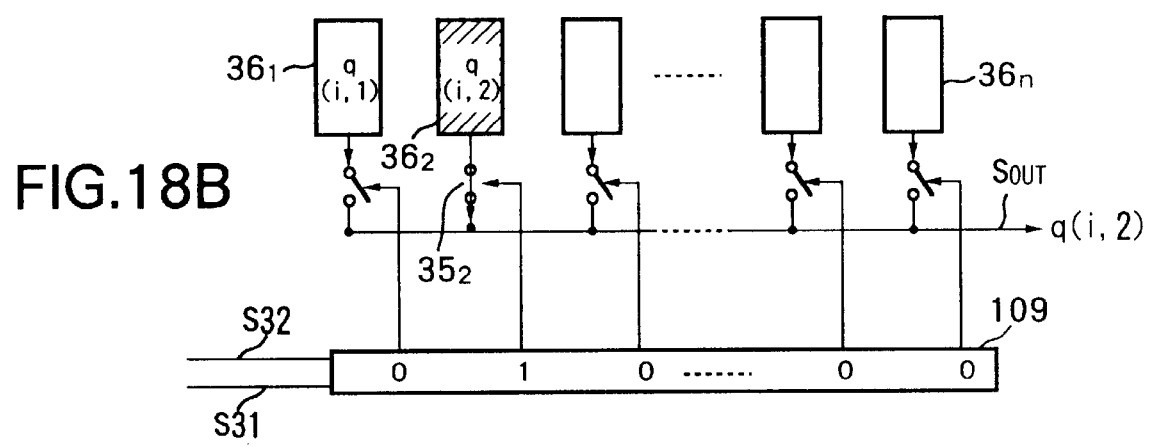
Figure 18C:
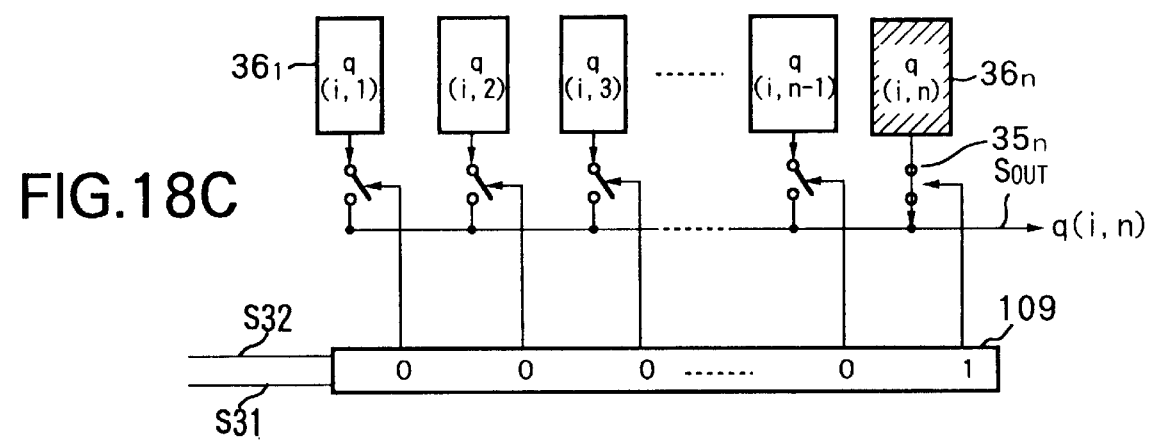

The processor elements $3_1$ to $3_n$ shown in FIG. 1 are the same as the processor elements $3_1$ to $3_n$ Of the parallel processor apparatus 101 shown in FIG. 11 and explained above.

The data input register 2 sequentially receives as input one horizontal sweep line's worth of the pixel data as the serial data $S_{IN}$, and outputs the pixel data to the processor elements $3_1$ to $3_n$ serving as the processing means in parallel.

The processor elements $3_1$ to $3_n$ process the one sweep line's worth of pixel data in parallel.

The data output register 4 receives as its input the processed one sweep line's worth of pixel data in parallel from the processor elements $3_1$ to $3_n$ and sequentially outputs the same as the serial data $S_{OUT}$.

In the parallel processor apparatus 1, in the same way as the parallel processor apparatus 101 illustrated in FIG. 11, as shown in FIG. 12, the image data comprised of pixel data comprised in turn of m×n number of pixels p(1,1) to p(m,n) arranged in the form of a matrix are processed according to the routine shown in FIG. 14. Explaining this by referring to FIG. 14. for example, the image data comprised by pixel data each composed of a plurality of bits are sequentially input to the input terminals in units of the pixel data. The pixel data of the first line is stored in the data input register 2 shown in FIG. 1 having a storage capacity of one line in the first one horizontal sweep duration (S1). The pixel data of the first line stored in the data input register 2 are output in parallel to the processor elements $3_1$ to $3_n$ within the next horizontal blanking duration (S2) so that one pixel's worth of the pixel data is supplied to one processor element.

In the next horizontal sweep duration (S3), the processor elements $3_1$ to $3_n$ process the supplied pixel data of the first line. Further, simultaneously with this, the pixel data of the second line are sequentially input to the data input register 2.

In the succeeding horizontal blanking duration (S4), the processed pixel data of the first line are supplied in parallel to the data output register 4 from each of the processor elements $3_1$ to $3_n$. Simultaneously with this, the pixel data of the second line are supplied in parallel to the processor elements $3_1$ to $3_n$ from the data input register 2.

In the next horizontal sweep duration (S5), the pixel data of the first line stored in the data output register 4 are sequentially output to the output terminal. Simultaneously with this, the processor elements $3_1$ to $3_n$ process the pixel data of the second line, and the pixel data of the third line are sequentially input to the data input register 2.

Thereafter, when the processor elements $3_1$ to $3_n$ process the pixel data of the i-th line, the operation of the data input register 2 receiving as input the pixel data of the (i+1)th line and the data output register 4 outputting the pixel data of the (i−1)th line is repeated.

In this way, by synchronous operation of the data input register 2, the processor elements $3_1$ to $3_n$, and the data output register 4, pixel data processed for every horizontal sweep duration are output.

Figure 2:
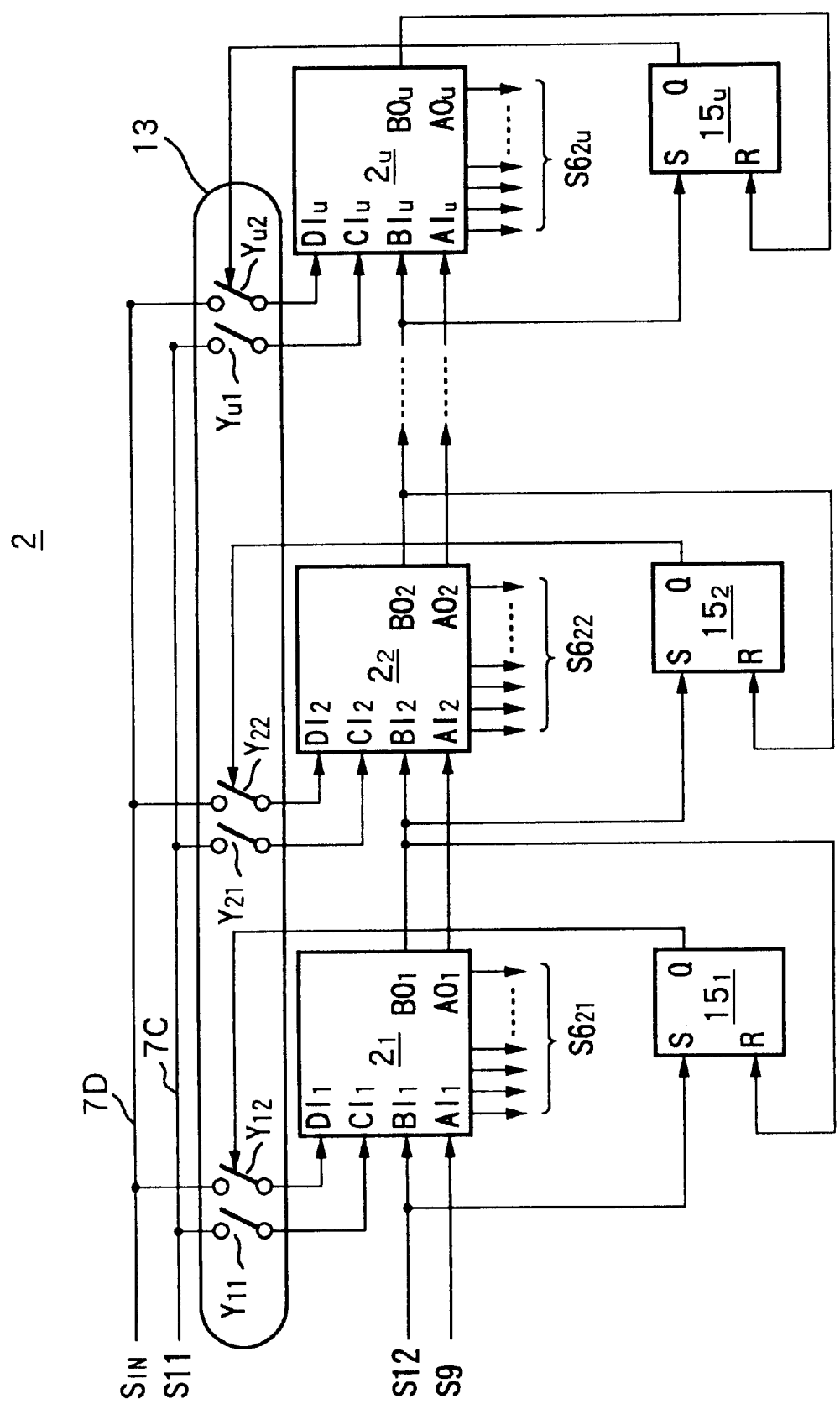
FIG. 2 is a circuit diagram of a data input register shown in FIG. 1.

FIG. 2 is a circuit diagram of the data input register 2 shown in FIG. 1.

The data input register 2 is provided with a switch circuit group 13 comprising nine switch circuits $Y_{11}$ to $Y_{U1}$ and $Y_{12}$ to $Y_{U2}$, nine data inputting means $2_1$ to $2_U$, and nine set-reset type flip-flops (RS flip-flops) $15_1$ to $15_U$.

The serial data input line 7D is connected to the input terminals of the serial data of the parallel processor apparatus, while the clock signal input line 7C is connected to the input terminals of the clock signal of the parallel processor apparatus.

The switch circuit $Y_{12}$ is provided between the input terminal $DI_1$ of the data inputting means $2_1$ and the serial data input line 7D. When the switch circuit $Y_{12}$ is in the ON state, the input terminal $DI_1$ and the serial data input line 7D are connected, while when the switch circuit $Y_{12}$ is in the OFF state, the input terminal $DI_1$ and the serial data input line 7D are broken in connection.

The switch circuit $Y_{11}$ is provided between the input terminal $CI_1$ of the data inputting means $2_1$ and the clock signal input line 7C. When the switch circuit $Y_{11}$ is in the ON state, the input terminal $CI_1$ and the clock signal input line 7C are connected, while when the switch circuit $Y_{11}$ is in the OFF state, the input terminal $CI_1$ and the clock signal input line 7C are broken in connection.

The first pointer data S12 is supplied to an input terminal $BI_1$ of the data inputting means $2_1$ and an S-terminal of the set-reset type flip-flop $15_1$.

The switch control signal S9 is supplied to an input terminal $AI_1$ of the data inputting means $2_1$. The switch control signal S9 passing through the data inputting means $2_1$ is output from the output terminal $AO_1$.

The first pointer data passing through the data inputting means $2_1$ is output from the output terminal $BO_1$ of the data inputting means $2_1$. This first pointer data is supplied to the R-terminal of the flip-flop $15_1$.

The operation of the switch circuits $Y_{11}$ and $Y_{12}$ is controlled by the output signal from the Q-terminal of the flip-flop $15_1$.

The data inputting means $2_1$ outputs a plurality of pixel data $S6_{21}$ to the processor element $3_1$ of FIG. 1 in parallel.

Similarly, the switch circuit $Y_{22}$ is provided between the input terminal $DI_2$ of the data inputting means $2_2$ and the serial data input line 7D. When the switch circuit $Y_{22}$ is in the ON state, the input terminal $DI_2$ and the serial data input line 7D are connected, while when the switch circuit $Y_{22}$ is in the OFF state, the input terminal $DI_2$ and the serial data input line 7D are broken in connection.

The switch circuit $Y_{21}$ is provided between the input terminal $CI_2$ of the data inputting means $2_2$ and the clock signal input line 7C. When the switch circuit $Y_{21}$ is in the ON state, the input terminal $CI_2$ and the clock signal input line 7C are connected, while when the switch circuit $Y_{21}$ is in the OFF state, the input terminal $CI_2$ and the clock signal input line 7C are broken in connection.

The first pointer data output from the output terminal $BO_1$ of the data inputting means $2_1$ is supplied to an input terminal $BI_2$ of the data inputting means $2_2$ and the S-terminal of the flip-flop $15_2$.

The switch control signal S9 output from the output terminal $AO_1$ of the data inputting means $2_1$ is supplied to an input terminal $AI_2$ of the data inputting means $2_2$. The switch control signal S9 passing through the data inputting means $2_2$ is output from the output terminal $AO_2$ of the data inputting means $2_2$. The first pointer data passing through the data inputting means $2_2$ is output from the output terminal $BO_2$ of the data inputting means $2_2$. This first pointer data is supplied to the R-terminal of the flip-flop $15_2$. The operation of the switch circuits $Y_{21}$ and $Y_{22}$ is controlled by the output signal from the Q-terminal of the flip-flop $15_2$. The data inputting means $2_2$ outputs a plurality of pixel data $S6_{22}$ to the processor element $3_2$ of FIG. 1 in parallel.

The same is true also for the data inputting means $2_3$ to $2_U$. The switch circuit $Y_{U2}$ is provided between the input terminal $DI_U$ of the data inputting means $2_U$ and the serial data input line 7D. When the switch circuit $Y_{U2}$ is in the ON state, the input terminal $DI_U$ and the serial data input line 7D are connected, while when the switch circuit $Y_{U2}$ is in the OFF state, the input terminal $DI_U$ and the serial data input line 7D are broken in connection.

The switch circuit $Y_{U1}$ is provided between the input terminal $CI_U$ of the data inputting means $2_U$ and the clock signal input line 7C. When the switch circuit $Y_{U1}$ is in the ON state, the input terminal $CI_U$ and the clock signal input line 7C are connected, while when the switch circuit $Y_{U1}$ is in the OFF state, the input terminal $CI_U$ and the clock signal input line 7C are broken in connection. The first pointer data output from the output terminal $BO_{U-1}$ of the data inputting means $2_{U-1}$ is supplied to an input terminal $BI_U$ of the data inputting means $2_U$ and the S-terminal of the flip-flop $15_U$.

The switch control signal S9 output from the output terminal $AO_{U-1}$ of the data inputting means $2_{U-1}$ is supplied to an input terminal $AI_U$ of the data inputting means $2_U$. The first pointer data passing through the data inputting means $2_{U-1}$ is output from the output terminal $BO_U$ of the data inputting means $2_U$. This first pointer data is supplied to the R-terminal of the flip-flop $15_U$. The operation of the switch circuits $Y_{U1}$ and $Y_{U2}$ is controlled by the output signal from the Q-terminal of the flip-flop $15_U$. The data inputting means $2_U$ outputs a plurality of pixel data $S6_{2U}$ to the processor element $3_U$ of FIG. 1 in parallel.

Figure 3:
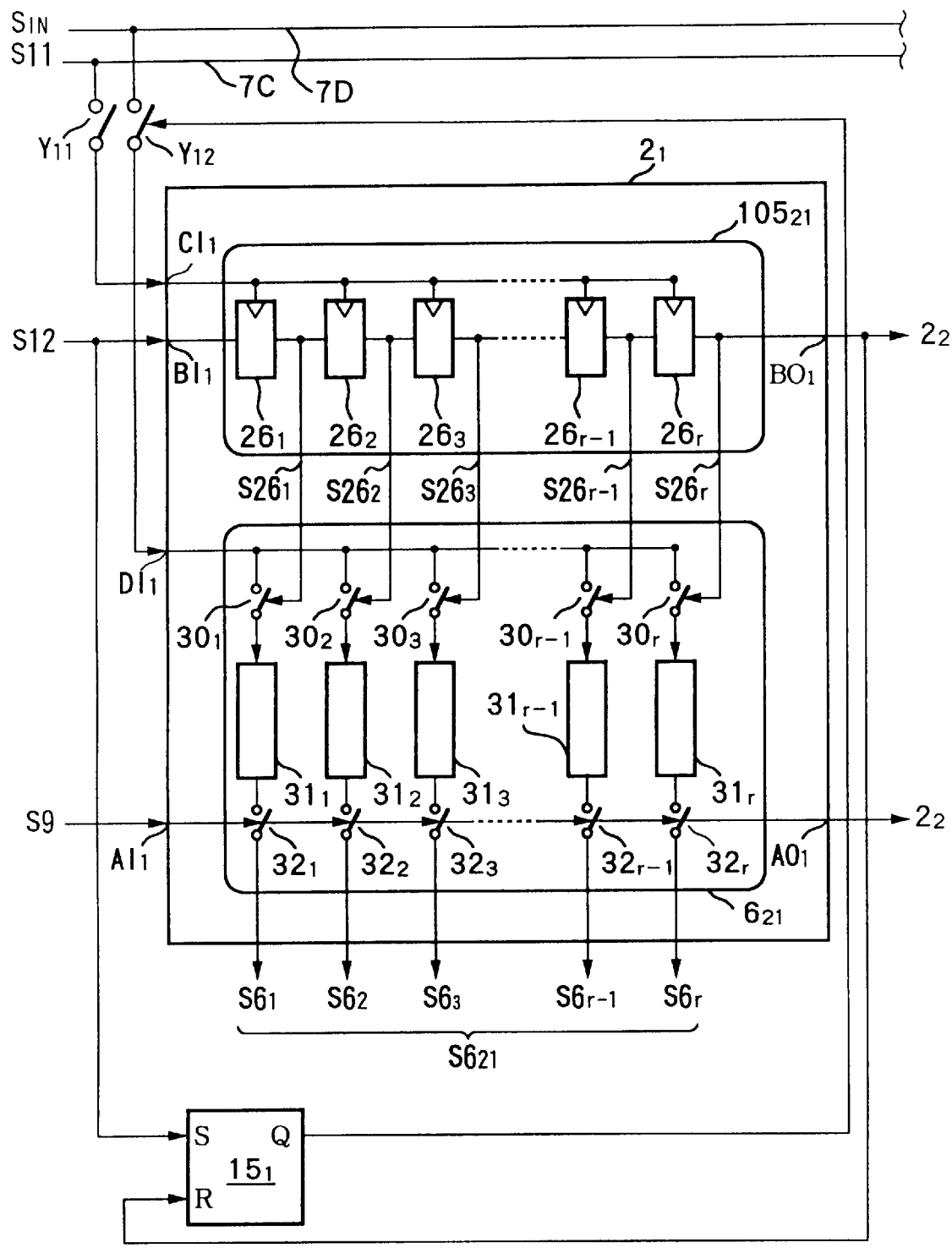
FIG. 3 is a circuit diagram of a data inputting means shown in FIG. 2.

FIG. 3 is a view for explaining the configuration of the data inputting means $2_1$ of FIG. 2.

The data inputting means $2_1$ has a pointer circuit $105_{21}$ and a conversion circuit $6_{21}$.

The pointer circuit $105_{21}$ is a shift register comprising a plurality of unit delay elements $26_1$ to $26_r$ connected in series so that the pointer data S12 is input to the unit delay element $26_1$ of the first stage, and the output of the unit delay element of the previous stage is input by the unit delay element of the latter stage. The unit delay element is constituted by a storing means, for example, a memory.

The conversion circuit $6_{21}$ is provided with a plurality of switching means $30_1$ to $30_r$, a plurality of memories $31_1$ to $31_r$, and a plurality of switching means $32_1$ to $32_r$. The plurality of memories $31_1$ to $31_r$ are provided corresponding to the plurality of unit delay elements $26_1$ to $26_r$. The plurality of switching means $30_1$ to $30_r$ are provided corresponding to the plurality of unit delay elements $26_1$ to $26_r$ and supply pixel data to corresponding memories $31_1$ to $31_r$ at timings in accordance with outputs from corresponding unit delay elements $26_1$ to $26_r$. The plurality of switching means $32_1$ to $32_r$ are provided corresponding to the memories $31_1$ to $31_r$ and supply the pixel data stored in the memories $31_1$ to $31_r$ as the pixel data $S6_1$ to $S6_r$ to the processor elements $3_1$ to $3_r$ when the switch control signal S9 has the logical value "1".

Note that the data inputting means $2_2$ to $2_U$ have similar structures to that of the data inputting means $2_1$. Namely, the data inputting means $2_2$ to $2_U$ have the same structure as a structure in which the input terminals $AI_1$, $BI_1$, $CI_1$, and $DI_1$ and the output terminals $AO_1$ and $BO_1$ of the data inputting means $2_1$ are replaced by the input terminals $AI_2$ to $AI_U$, $BI_2$ to $BI_U$, $CI_2$ to $CI_U$ and $DI_2$ to $DI_U$ and the output terminals $AO_2$ to $AO_U$ and $BO_2$ to $BO_U$.

In the data inputting means $2_U$, it is not necessary to output the switch control signal S9, so the output terminal $AO_U$ can be deleted too. Note that, for a simpler structure, the explanation was made of a case where a relationship of n=r×U is established.

The pixel data group $S6_{21}$ output from the data inputting means $2_1$ is comprised by pixel data $S6_1$ to $S6_r$. The pixel data group $S6_{22}$ output from the data inputting means $2_2$ is comprised by pixel data $S6_{n-r+1}$ to $S6_{2r}$. The pixel data group $S6_{2U}$ output from the data inputting means $2_U$ is comprised by pixel data $S6_{n-r+1}$ to $S6_n$.

Data inputting means $2_1$ to $2_U$ of a plurality of blocks provided with a plurality of unit delay elements $26_1$ to $26_r$ for sequentially transferring pointer data, memories $31_1$ to $31_r$ and switching means $30_1$ to $30_r$ provided corresponding to the plurality of unit delay elements $26_1$ to $26_r$, and switching means $32_1$ to $32_r$ provided corresponding to the memories $31_1$ to $31_r$ is constituted in this way.

As a detection circuit for detecting the time of input and the time of output of the pointer data in the data inputting means $2_1$ to $2_U$, the set-reset type flip-flops $15_1$ to $15_U$ are provided.

The switch circuits $Y_{12}$ to $Y_{U2}$ connect the related data inputting means and the serial data input line 7D only for a period from the time of input to the time of output of the pointer data in either of the data inputting means $2_1$ to $2_U$ detected by the flip-flops $15_1$ to $15_U$.

The switch circuits $Y_{11}$ to $Y_{U1}$ connect the related data inputting means and the clock signal input line 7C only for a period from the time of input to the time of output of the pointer data in either of the data inputting means $2_1$ to $2_U$ detected by the flip-flops $15_1$ to $15_U$.

The pointer circuit $105_{21}$ of FIG. 3 is structured with the unit delay elements $26_1$ to $26_r$ connected in series, receives as its input the clock signal S11 and the pointer data S12, and outputs the pointer data $S26_1$ to $S26_r$ to the conversion circuit $6_{21}$.

The conversion circuit $6_{21}$ has parallelly arranged switching means $30_1$ to $30_r$, memories $31_1$ to $31_r$ and switching means $32_1$ to $32_r$ receives as its input the serial data $S_{IN}$, pointer data $S26_1$ to $S26_r$, and the switch control signal S9, and outputs the parallel data $S6_{21}$ to the processor elements $3_1$ to $3_r$.

Here, the signal data input line 7D for transmitting the serial data $S_{IN}$ and signal lines for transmitting parallel data $S6_1$ to $S6_r$ have a width or number of bits sufficient for expressing the data of one pixel.

The operation of the data inputting means $2_1$ will be explained next by referring to FIG. 3 and FIGS. 4A to 4C.

The pointer data S 12 is supplied to the input terminal $BI_1$ of the data inputting means $2_1$, the pointer data S12 is supplied to the S-terminal of the flip-flop $15_1$ at this time, and the Q-terminal of the flip-flop $15_1$ becomes the logical value "1" in level. The output signal of the logical value "1" from the Q-terminal of the flip-flop $15_1$ is supplied as the control signal of the switch circuits $Y_{11}$ and $Y_{12}$ and makes the switch circuits $Y_{11}$ and $Y_{12}$ the ON state (connection state). By turning on the switch circuit $Y_{11}$, the input terminal $CI_1$ of the data inputting means $2_1$ and the clock signal input line 7C are connected, and the clock signal S11 is supplied to the input terminal $CI_1$. By turning on the switch circuit $Y_{12}$, the input terminal $DI_1$ of the data inputting means $2_1$ and the serial data input line 7D are connected, and the serial data $S_{IN}$ is supplied to the input terminal $DI_1$.

In the conversion circuit $6_{21}$, among the switching means $30_1$ to $30_r$ the switching means by which the pointer data $S26_1$ to $S26_r$ become the logical value "1" becomes the ON state, and corresponding pixel data among sequentially input serial data $S_{IN}$ are stored. Namely, in synchronization with the logical value "1" being given to the pointer data S12 for only the first clock cycle of the horizontal sweep duration and the pulse being given to the clock signal S11, when for example the pixel data of the pixels p(i,1) to p(i,r) of the i-th line are sequentially given as the serial data $S_{IN}$ to the memories $31_1$ to $31_r$, this amount of the pixel data are stored in the memories $31_1$ to $31_r$.

Figure 4A:
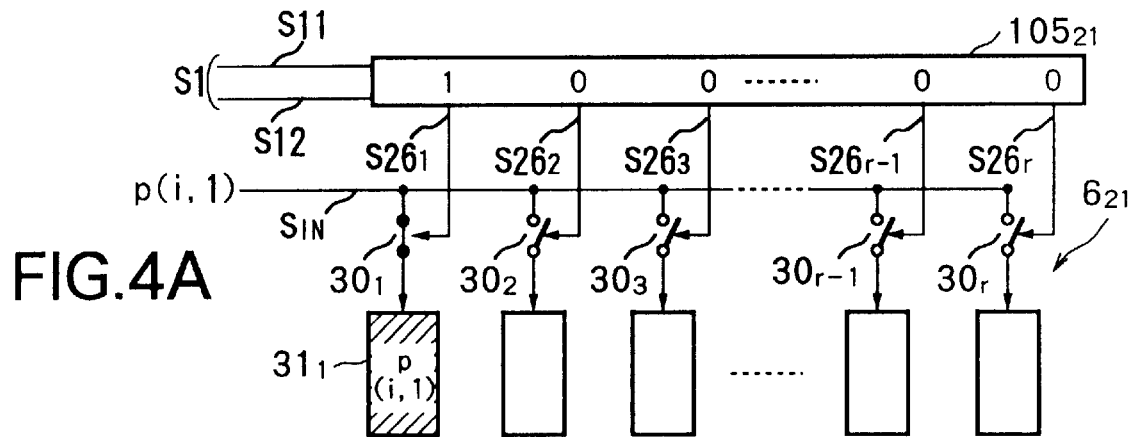
FIGS. 4A to 4C are views for explaining an operation of the data inputting means shown in FIG. 3.

Namely, first, the pointer data $S26_1$ indicates the logical value "1", as shown in FIG. 4A, the switching means $30_1$ becomes the ON state, and the pixel data of the pixel p(i,1) is stored in the memory $31_1$. At this time, the pointer data $S26_2$ to $S26_r$ indicate the logical value "0", and the switching means $30_2$ to $30_r$ have become the OFF state.

Figure 4B:
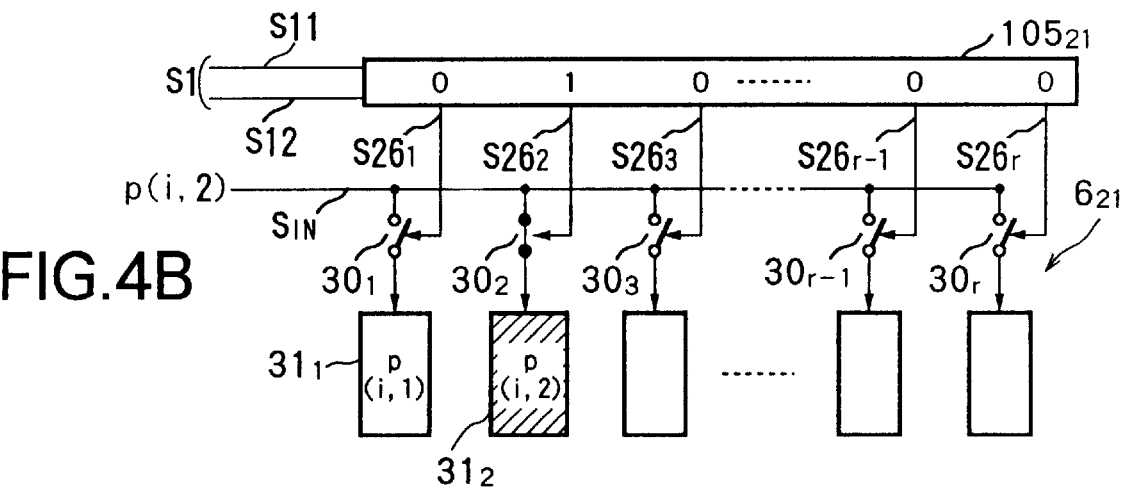

The pointer data $S26_2$ indicates the logical value "1", as shown in FIG. 4B, the switching means $30_2$ becomes the ON state, and the pixel data of the pixel p(i,2) is stored in the memory $31_2$. At this time, the pointer data $S26_1$ and $S26_3$ to $S26_r$ indicate the logical value "0", and the switching means $30_1$ and $30_3$ to $30_r$ have become the OFF state.

The pointer data $S26_2$ to $S26_{r-1}$ sequentially indicate the logical value "1". After similar processing, the pixel data of the pixels p(i,3) to p(i,r-1) are sequentially stored in the memories $31_3$ to $31_{r-1}$.

Figure 4C:
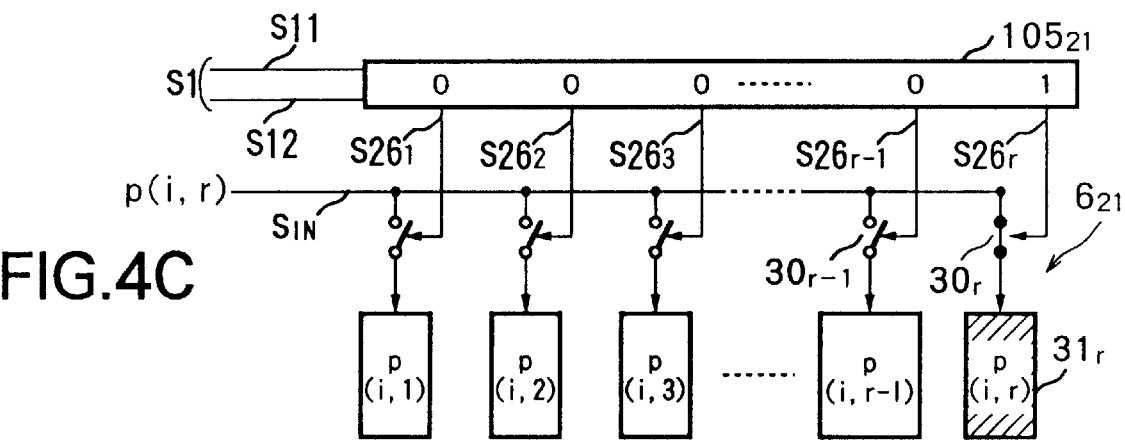

Finally, the pointer data $S26_r$ indicates the logical value "1", as shown in FIG. 4C, the switching means $30_r$ becomes the ON state, and the pixel data of the pixel p(i,r) is stored in the memory $31_r$.

The output signal of the unit delay element $26_r$ is supplied as the pointer data $S26_r$ to the switching means $30_r$ and the R-terminal of the flip-flop $15_1$, and the Q-terminal becomes the logical value "0" in level. The signal of the logical value "0" from the Q-terminal of the flip-flop $15_1$ is supplied as the control signal to the switch circuits $Y_{11}$ and $Y_{12}$ and makes the switch circuits $Y_{11}$ and $Y_{12}$ the OFF state. As a result, the clock signal input line 7C and the input terminal $CI_1$ are broken in connection, and the serial data input line 7D and the input terminal $DI_1$ are broken in connection.

Further, the output signal from the unit delay element of the last stage of the pointer circuit $105_{21}$ is supplied as the pointer data to the input terminal $BI_2$ of the data inputting means $2_2$ and the S-terminal of the flip-flop $15_2$ after passing through the output terminal $BO_1$.

By the pointer data input to the S-terminal of the flip-flop $15_2$, the Q-terminal outputs the signal of the logical value "1". The output signal of the logical value "1" from this Q-terminal is supplied as the control signal of the switch circuits $Y_{21}$ and $Y_{22}$ and makes the switch circuits $Y_{21}$ and $Y_{22}$ the ON state. By turning on the switch circuit $Y_{21}$, the input terminal $CI_2$ of the data inputting means $2_2$ and the clock signal input line 7C are connected, and the clock signal S11 is supplied to the input terminal CI$_2$. By turning on the switch circuit Y$_{22}$, the input terminal DI$_2$ of the data inputting means $2_2$ and the serial data input line 7D are connected, and the serial data S$_{IN}$ is supplied to the input terminal DI$_2$. In the data inputting means $2_2$, after similar processing to that of the data inputting means $2_1$, pixel data of the pixels p(i,r+1) to p(i,2r) are sequentially stored in the memories $31_{r+1}$ to $31_{2r}$.

From the data inputting means $2_3$ and the flip-flop $15_3$ to the data inputting means $2_U$ and the flip-flop $15_U$, similar processing to that mentioned above is carried out, and the pixel data of pixels p(i,1) to p(i,n) are stored in the memories $31_1$ to $31_n$ of the data input register 2.

In the horizontal blanking duration, the switch control signal S9 becomes the logical value "1", the switching means $32_1$ to $32_n$ simultaneously switch to the ON state, and the pixel data S$6_1$ to S$6_n$ stored in the memories $31_1$ to $31_n$ are output to the processor elements $3_1$ to $3_n$ in parallel.

FIG. 5 is a view for explaining one example of a truth value of the set-reset type flip-flop (also referred to as a RS flip-flop or RS latch).

In this flip-flop, when the S-terminal has the logical value "1" and the R-terminal has the logical value "0", the Q-terminal becomes the logical value "1". When the S-terminal has the logical value "0" and the R-terminal has the logical value "1", the terminal becomes the logical value "0". When the S-terminal has the logical value "0" and the R-terminal has the logical value "0", the Q-terminal holds the logical value before this as it is. A case where the S-terminal has the logical value "1" and the R-terminal has the logical value "1" is prohibited.

Figure 6:
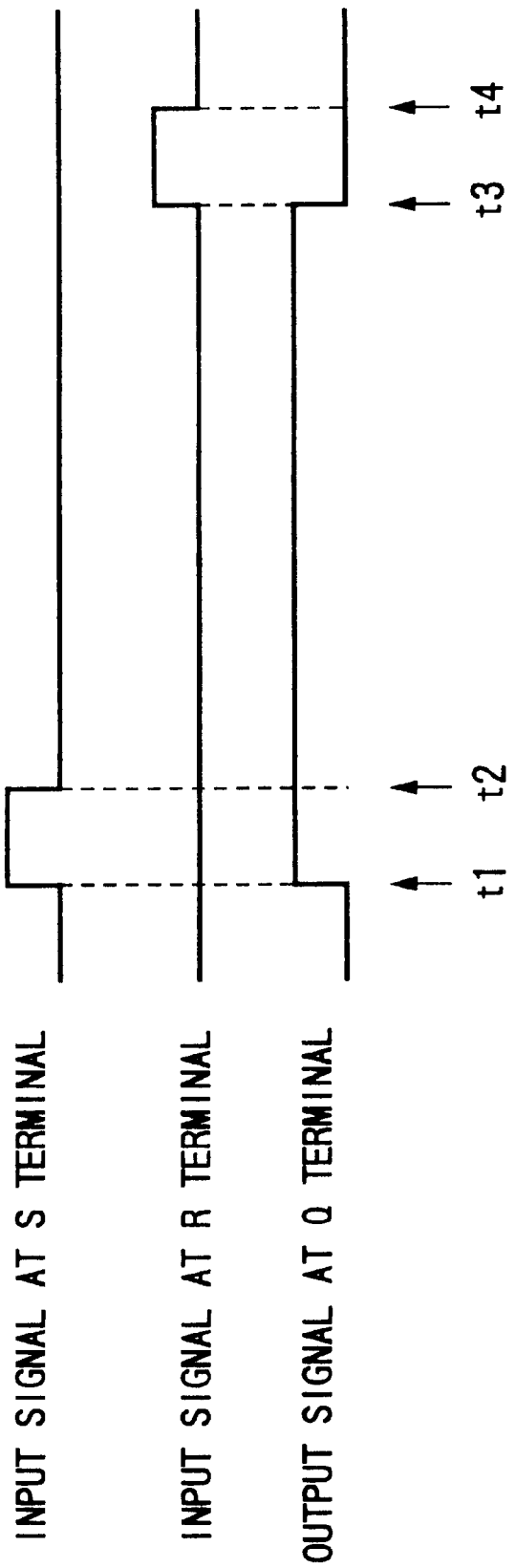
FIG. 6 is a view of the operation timing of the set-reset type flip-flop.

FIG. 6 is a timing chart for explaining the operation of the set-reset type flip-flop.

At a time t1, the input signal of the S-terminal changes from the logical value "0" to the logical value "1", the input signal of the R-terminal holds its logical value "0" as it is, and the output signal of the Q-terminal changes from the logical value "0" to the logical value "1" by this. At a time t2, the input signal of the S-terminal changes from the logical value "1" to the logical value "0", the input signal of the R-terminal holds its logical value "0" as it is, and the output signal of the Q-terminal holds its logical value "1" as it is. At a time t3, the input signal of the S-terminal holds its logical value "0" as it is, the input signal of the R-terminal changes from the logical value "0" to the logical value "1", and the output signal of the Q-terminal changes from the logical value "1" to the logical value "0" by this. At a time t4, the input signal of the S-terminal holds its logical value "0" as it is, the input signal of the R-terminal changes from the logical value "1" to the logical value "0", and the output signal of the Q-terminal holds its logical value "0" as it is.

Figure 7:
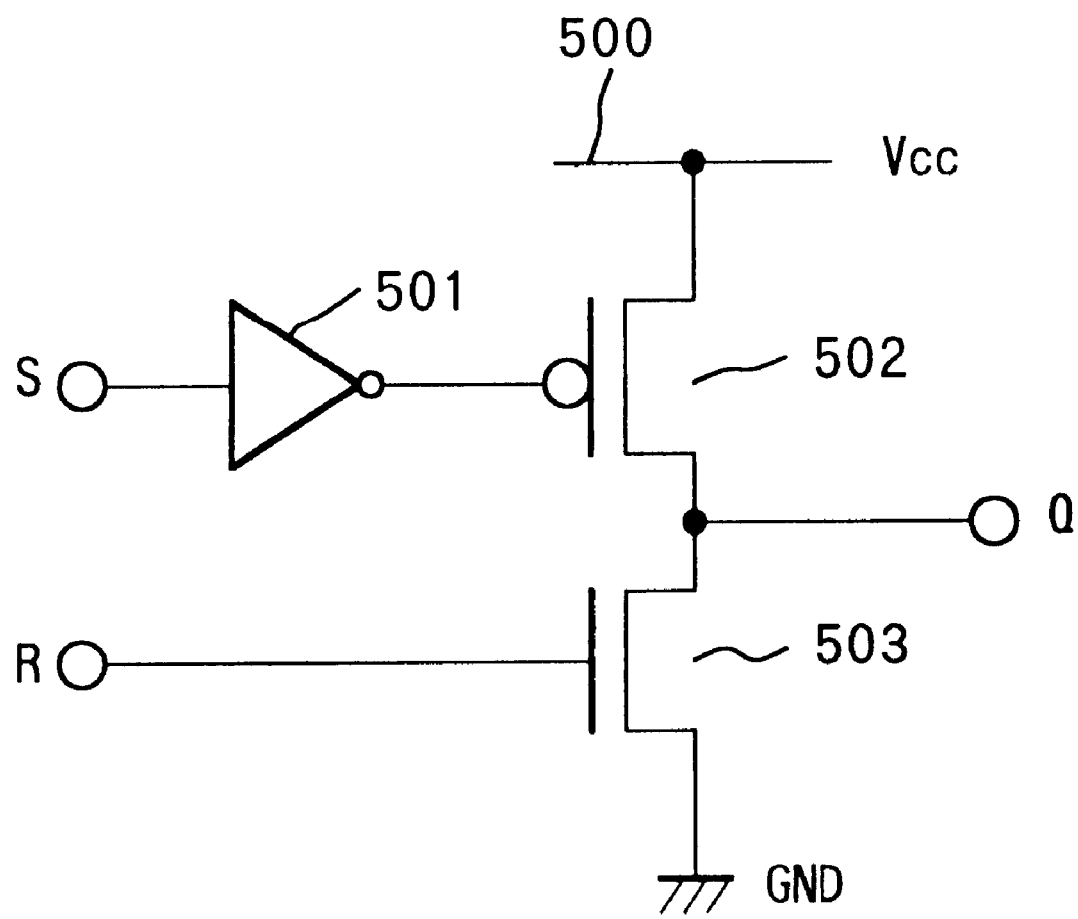
FIG. 7 is a circuit diagram for explaining a charge-discharge circuit as an example of the flip-flop circuit.

The truth values shown in FIG. 5 can be obtained by the set-reset type flip-flop, but can be obtained also by the charge-discharge circuit of FIG. 7. It is also possible to use this charge-discharge circuit as a detection circuit in place of the set-reset type flip-flop.

The charge-discharge circuit illustrated in FIG. 7 is provided with an inverter 501, a P-channel type field effect transistor 502, and an N-channel type field effect transistor 503. Note that the letters GND in the figure indicate a ground voltage (earth voltage) and indicate a voltage corresponding to the logical value "0".

The S-terminal is connected to the input terminal of the inverter 501, and the output terminal of the inverter 501 is connected to the gate of the field effect transistor 502. The drain (or source) of the field effect transistor 502 is connected to a supply line 500 of a power supply voltage Vcc corresponding to the voltage of the logical value "1". The source (or drain) of the field effect transistor 502 is connected to the drain of the field effect transistor 503, and the source of the field effect transistor 503 is grounded. The R-terminal is connected to the gate of the field effect transistor 503. The Q-terminal is connected to the drain of the field effect transistor 503.

In the charge-discharge circuit of FIG. 7, when the S-terminal has the logical value "1" and the R-terminal has the logical value "0", the gate of the field effect transistor 502 has the logical value "0". At this time, the field effect transistor 502 is in the ON state and, at the same time, the field effect transistor 503 is in the OFF state. Accordingly, the Q-terminal becomes the logical value "1" and, at the same time, a charge is stored between the drain and the source of the field effect transistor 503, and this charge-discharge circuit is charged.

In the charge-discharge circuit of FIG. 7, when the S-terminal has the logical value "0" and the R-terminal has the logical value "1", the gate of the field effect transistor 502 has the logical value "1". At this time, the field effect transistor 502 is in the OFF state and, at the same time, the field effect transistor 503 is in the ON state. Accordingly, the Q-terminal becomes the logical value "0" and, at the same time, the drain and the source of the field effect transistor 503 become the conductive state, and the charge-discharge circuit is discharged.

In the charge-discharge circuit of FIG. 7, when the S-terminal has the logical value "0" and the R-terminal has the logical value "0", the gate of the field effect transistor 502 has the logical value "1". At this time, the field effect transistor 502 is in the OFF state and, at the same time, the field effect transistor 503 is in the OFF state. Accordingly, the logical value of the Q-terminal holds its logical value in the state immediately before the state where the S-terminal and the R-terminal have the logical value "0" as it is.

In the charge-discharge circuit of FIG. 7. when the S-terminal has the logical value "1" and the R-terminal has the logical value "1", the gate of the field effect transistor 502 has the logical value "0". At this time, the field effect transistor 502 is in the ON state and, at the same time, the field effect transistor 503 is in the ON state, and the supply line 500 of the power supply voltage Vcc and the earth are short-circuited. For this reason, the case where the S-terminal has the logical value "1" and the R-terminal has the logical value "1" is prohibited.

By constituting the detection circuit by using the flip-flop or the charge-discharge circuit, a simpler circuit configuration can be achieved compared with a case where the time of input and the time of output of the pointer data to and from the data inputting means are detected by providing a counter circuit for counting pulses of the clock signal. By making the number of the flip-flops or the number of the charge-discharge circuits the same as the number of the data inputting means, waste of the circuits can be eliminated.

For example, in the embodiment, where n=1000, r=100, and U=10, the number of switching means connected to the serial data input line 7D becomes 110 or the sum of 10 of the switching means Y$_{12}$ to Y$_{102}$ and 100 of the switching means $30_1$ to $30_{100}$ in the data inputting means. On the other hand, in the parallel processor apparatus of the related art not constituting the data inputting means, the number of the switching means connected to the serial data input line 7D becomes 1000 of the switching means $30_1$ to $30_{1000}$ in the data input register. Accordingly, according to the parallel processor apparatus of the present invention, the number of the switching means connected to the serial data input line 7D can be decreased, and a static capacitance of the switching means parasitic to the serial data input line 7D can be reduced.

Accordingly the power consumption of the parallel processor apparatus when converting the serial data $S_{IN}$ to parallel data $S6_1$ to $S6_n$ can be reduced and, at the same time, the operating speed can be raised.

A detailed explanation will be made next of the data output register 4.

Figure 8:
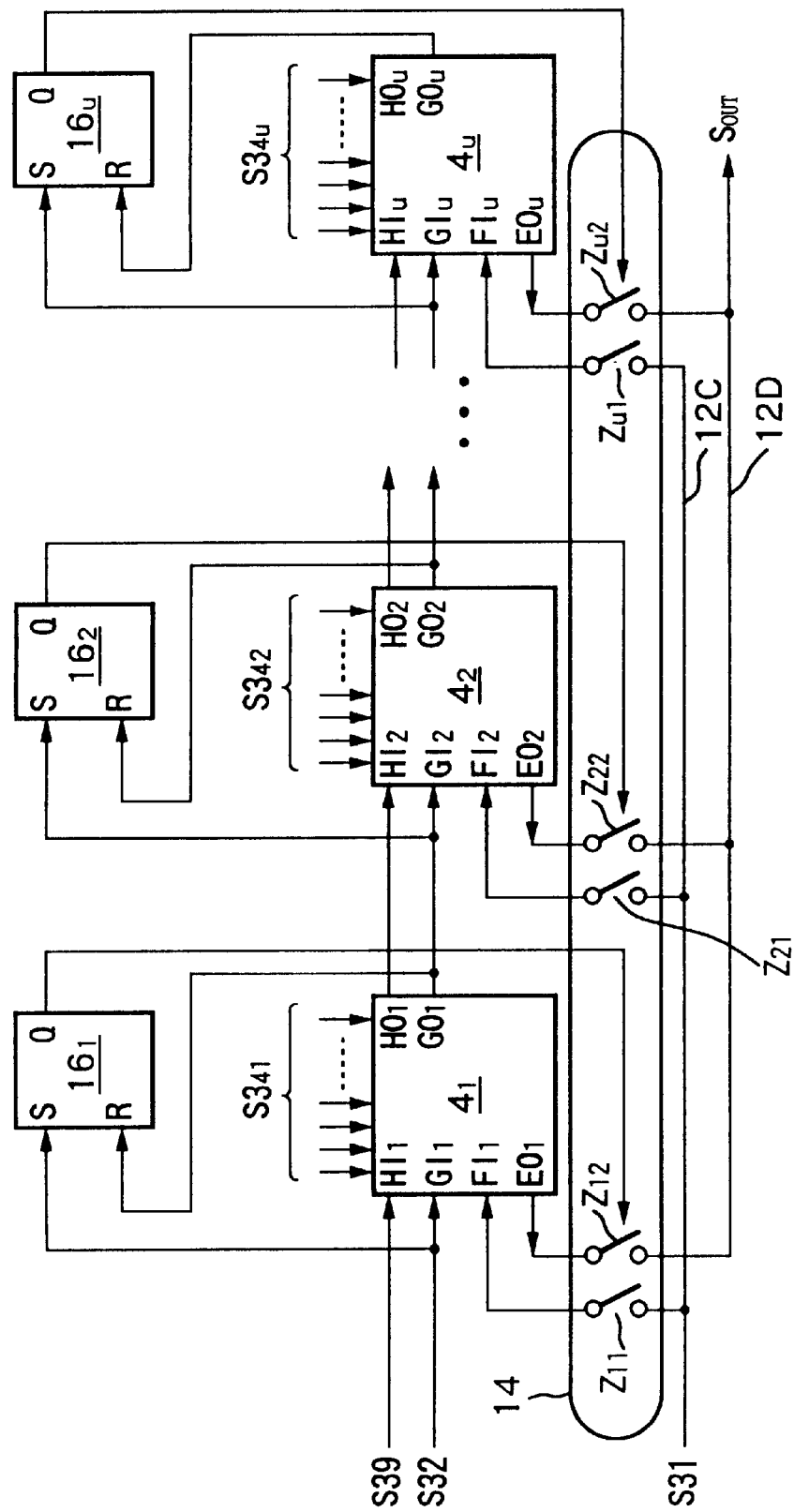
FIG. 8 is a circuit diagram of a data output register shown in FIG. 1.

FIG. 8 is a circuit diagram of the data output register 4.

The data output register 4 is provided with a switch circuit group 14 comprising switch circuits $Z_{11}$ to $Z_{U1}$ and $Z_{12}$ to $Z_{U2}$, data outputting means $4_1$ to $4_U$, and set-reset type flip-flops (RS flip-flops) $16_1$ to $16_U$.

The serial data output line 12D is connected to the output terminal of the serial data of the parallel processor apparatus, and the clock signal input line 12C is connected to the input terminal of the clock signal of the parallel processor apparatus.

The switch circuit $Z_{12}$ is provided between the output terminal $EO_1$ of the data outputting means $4_1$ and the serial data output line 12D. When the switch circuit $Z_{12}$ is in the ON state, the output terminal $EO_1$ and the serial data output line 12D are connected, while when the switch circuit $Z_{12}$ is in the OFF state, the output terminal $EO_1$ and the serial data output line 12D are broken in connection.

The switch circuit $Z_{11}$ is provided between the input terminal $FI_1$ of the data outputting means $4_1$ and the clock signal input line 12C. When the switch circuit $Z_{11}$ is in the ON state, the input terminal $FI_1$ and the clock signal input line 12C are connected, while when the switch circuit $Z_{11}$ is in the OFF state, the input terminal $FI_1$ and the clock signal input line 12C are broken in connection.

The second pointer data S32 is supplied to the input terminal $GI_1$ of the data outputting means $4_1$ and the S-terminal of the set-reset type flip-flop $16_1$.

The switch control signal S39 is supplied to the input terminal $HI_1$ of the data outputting means $4_1$. The switch control signal S39 passing through the data outputting means $4_1$ is output from the output terminal $HO_1$.

The second pointer data passing through the data outputting means $4_1$ is output from the output terminal $GO_1$ of the data outputting means $4_1$. This second pointer data is supplied to the R-terminal of the flip-flop $16_1$. The operation of the switch circuits $Z_{11}$ and $Z_{12}$ is controlled by the output signal from the Q-terminal of the flip-flop $16_1$. The data outputting means $4_1$ receives as its inputs a plurality of pixel data $S3_{41}$ from the processor element.

Similarly, the switch circuit $Z_{22}$ is provided between the output terminal $EO_2$ of the data outputting means $4_2$ and the serial data output line 12D. When the switch circuit $Z_{22}$ is in the ON state, the output terminal $EO_2$ and the serial data output line 12D are connected, while when the switch circuit $Z_{22}$ is in the OFF state, the output terminal $EO_2$ and the serial data output line 12D are broken in connection.

The switch circuit $Z_{21}$ is provided between the input terminal $FI_2$ of the data outputting means $4_2$ and the clock signal input line 12C. When the switch circuit $Z_{21}$ is in the ON state, the input terminal $FI_2$ and the clock signal input line 12C are connected, while when the switch circuit $Z_{21}$ is in the OFF state, the input terminal $FI_2$ and the clock signal input line 12C are broken in connection. The second pointer data output from the output terminal $GO_1$ of the data outputting means $4_1$ is supplied to the input terminal $GI_2$ of the data outputting means $4_2$ and the S-terminal of the flip-flop $16_2$.

The switch control signal S39 output from the output terminal $HO_1$ of the data outputting means $4_1$ is supplied to the input terminal $HI_2$ of the data outputting means $4_1$. The switch control signal S39 passing through the data outputting means $4_2$ is output from the output terminal $HO_2$ of the data outputting means $4_2$. The second pointer data passing through the data outputting means $4_2$ is output from the output terminal $GO_2$ of the data outputting means $4_2$. This second pointer data is supplied to the R-terminal of the flip-flop $16_2$. The operation of the switch circuits $Z_{21}$ and $Z_{22}$ is controlled by the output signal from the Q-terminal of the flip-flop $16_2$. The data outputting means $4_2$ receives as its inputs a plurality of pixel data $S3_{42}$ from the processor element.

The same is true also for the data outputting means $4_3$ to $4_U$. The switch circuit $Z_{U2}$ is provided between the output terminal $EO_U$ of the data outputting means $4_U$ and the serial data output line 12D. When the switch circuit $Z_{U2}$ is in the ON state, the output terminal $EO_U$ and the serial data output line 12D are connected, while when the switch circuit $Z_{U2}$ is in the OFF state, the output terminal $EO_U$ and the serial data output line 12D are broken in connection.

The switch circuit $Z_{U1}$ is provided between the input terminal $FI_U$ of the data outputting means $4_U$ and the clock signal input line 12C. When the switch circuit $Z_{U1}$ is in the ON state, the input terminal $FI_U$ and the clock signal input line 12C are connected, while when the switch circuit $Z_{U1}$ is in the OFF state, the input terminal $FI_U$ and the clock signal input line 12C are broken in connection. The second pointer data output from the output terminal $GO_{U-1}$ of the data outputting means $4_{U-1}$ is supplied to the input terminal $GI_U$ of the data outputting means $4_U$ and the S-terminal of the flip-flop $16_U$.

The switch control signal S39 output from the output terminal $HO_{U-1}$ of the data outputting means $4_{U-1}$ is supplied to the input terminal $HI_U$ of the data outputting means $4_U$. The second pointer data passing through the data outputting means $4_{U-1}$ is output from the output terminal $GO_U$ of the data outputting means $4_U$. This second pointer data is supplied to the R-terminal of the flip-flop $16_U$. The operation of the switch circuits $Z_{U1}$ and $Z_{U2}$ is controlled by the output signal from the Q-terminal of the flip-flop $16_U$. The data outputting means $4_U$ receives as its inputs a plurality of pixel data $S3_{4U}$ from the processor element.

Figure 9:
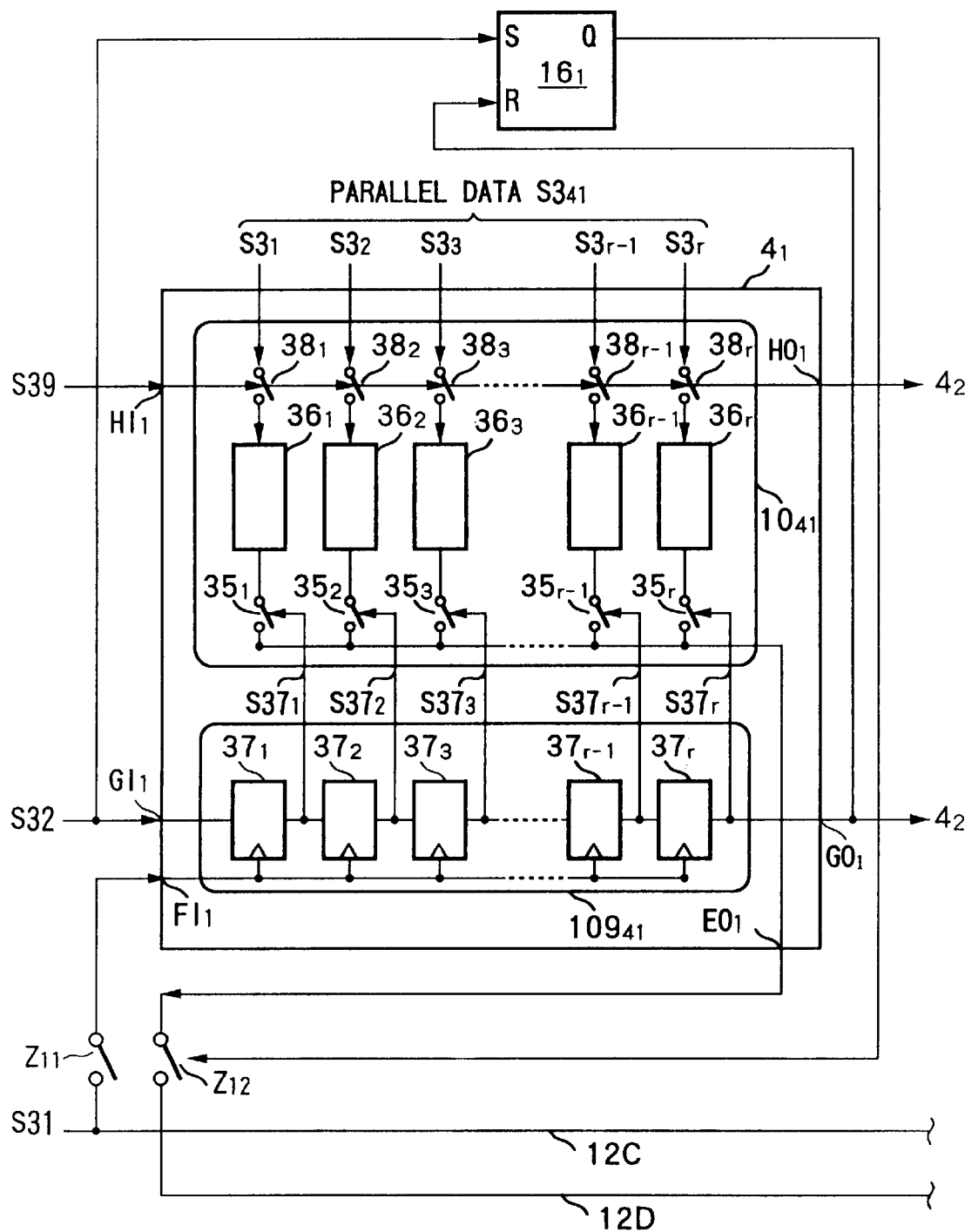
FIG. 9 is a circuit diagram of a data outputting means shown in FIG. 8.

FIG. 9 is a view for explaining the structure of the data outputting means $4_1$ of FIG. 8.

The data outputting means $4_1$ has a pointer circuit $109_{41}$ and a conversion circuit $10_{41}$.

The pointer circuit $109_{41}$ is a shift register comprising serially connected unit delay elements $37_1$ to $37_r$ so that the pointer data 32 is input to the unit delay element $37_1$ of the initial stage and so that the unit delay element of a latter stage receives as its input the output of the unit delay element of a previous stage. The unit delay elements and memories constitute the storing means.

The conversion circuit $10_{41}$ is provided with a plurality of switching means $35_1$ to $35_r$, a plurality of memories $36_1$ to $36_r$, and a plurality of switching means $38_1$ to $38_r$. The plurality of memories $36_1$ to $36_r$ are provided individually corresponding to the plurality of unit delay elements $37_1$ to $37_r$.

The plurality of switching means $38_1$ to $38_r$ are provided corresponding to the memories $36_1$ to $36_r$ and supply pixel data $S3_1$ to $S3_r$ from the processor elements $3_1$ to $3_r$ to the memories $36_1$ to $36_r$ when the switch control signal S39 has the logical value "1".

The plurality of switching means $35_1$ to $35_r$ are provided corresponding to the plurality of unit delay elements $37_1$ to $37_r$, supply the pixel data stored in the corresponding memories $36_1$ to $36_r$ to the serial data output line 12D at the timing in accordance with the output from the corresponding unit delay elements $37_1$ to $37_r$, and generate the serial data $S_{OUT}$.

Note that the data outputting means $4_2$ to $4_U$ are formed by a similar structure to that of the data outputting means $4_1$. Namely, the data outputting means $4_2$ to $4_U$ have a structure the same as the structure in which the input terminals $FI_1$, $GI_1$ and $HI_1$ and the output terminals $EO_1$, $GO_1$ and $HO_1$ of the data outputting means $4_1$ are replaced by the input terminals $FI_2$ to $FI_U$, $GI_2$ to $GI_U$ and $HI_2$ to $HI_U$ and output terminals $EO_2$ to $EO_U$, $GO_2$ to $GO_U$ and $HO_2$ to $HO_U$.

In the data outputting means $4_U$, it is not necessary to output the switch control signal S39, therefore it is also possible to delete the output terminal $HO_U$. Note that, for simplifying the structure, an explanation will be made of the case where the relationship of n=r×U is established.

The pixel data group $S3_{41}$ input to the data outputting means $4_1$ is comprised by pixel data $S3_1$ to $S3_r$. The pixel data group $S3_{42}$ input to the data outputting means $4_2$ is comprised by pixel data $S3_{r+1}$ to $S3_{2r}$. The pixel data group $S3_{4U}$ input to the data outputting means $4_U$ is comprised by pixel data $S3_{n-r+1}$ to $S3_n$.

Data outputting means $4_1$ to $4_U$ of a plurality of blocks provided with a plurality of unit delay elements $37_1$ to $37_r$ for sequentially transferring the pointer data, memories $36_1$ to $36_r$ and switching means $35_1$ to $35_r$ provided corresponding to the plurality of unit delay elements $37_1$ to $37_r$, and the switching means $38_1$ to $38_r$ provided corresponding to the memories $36_1$ to $36_r$ is constituted in this way.

As the detection circuit for detecting the time of input and the time of output of the pointer data in the data outputting means $4_1$ to $4_U$, the set-reset type flip-flops $16_1$ to $16_U$ are provided.

The switch circuits $Z_{12}$ to $Z_{U2}$ connect the related data outputting means and the serial data output line 12D only during the period from the time of input to the time of output of the pointer data in one of the data outputting means $4_1$ to $4_U$ detected by the flip-flops $16_1$ to $16_U$.

The switch circuits $Z_{11}$ to $Z_{U1}$ connect the related data outputting means and the clock signal input line 12C only during the period from the time of input to the time of output of the pointer data in one of the data outputting means $4_1$ to $4_U$ detected by the flip-flops $16_1$ to $16_U$.

The pointer circuit $109_{41}$ of FIG. 9 is structured with the unit delay elements $37_1$ to $37_n$ connected in series, receives as its inputs the clock signal S31 and the pointer data S32, and outputs the pointer data $S37_1$ to $S37_r$ to the conversion circuit $10_{41}$.

The conversion circuit $10_{41}$ has parallelly arranged switching means $35_1$ to $35_r$, memories $36_1$ to $36_r$, and switching means $38_1$ to $38_r$, receives as its inputs the parallel data $S3_{41}$, pointer data $S37_1$ to $37_r$, and the switch control signal S39, and supplies the pixel data stored in the memories $36_1$ to $36_r$ via the switch circuit $Z_{12}$ to the serial data output line 12D.

The operation of the data outputting means $4_1$ will be explained by referring to FIG. 9 and FIGS. 10A to 10C.

When the processing of the pixel data is terminated in the processor elements $3_1$ to $3_n$ shown in FIG. 1, in the horizontal blanking duration, the switch control signal S39 becomes the logical value "1", this switch control signal S39 is supplied to the data outputting means $4_1$ to $4_U$, and the switching means $38_1$ to $38_n$ become the ON state. By this, the pixel data processed in the processor elements $3_1$ to $3_n$ are simultaneously stored in the memories $36_1$ to $36_n$.

The pointer data S32 is supplied to the input terminal $GI_1$ of the data outputting means $4_1$, the pointer data S32 is supplied to the S-terminal of the flip-flop $16_1$ at this time, and the Q-terminal of the flip-flop $16_1$ becomes the level of the logical value "1". The signal of the logical value "1" from this Q-terminal is supplied as the control signal of the switch circuits $Z_{11}$ and $Z_{12}$ and makes the switch circuits $Z_{11}$ and $Z_{12}$ the OM state. By turning on the switch circuit $Z_{11}$, the input terminal $FI_1$ of the data outputting means $4_1$ and the clock signal input line 12C are connected, and the clock signal S31 is supplied to the input terminal $FI_1$. By turning on the switch circuit $Z_{12}$, the output terminal $EO_1$ of the data outputting means $4_1$ and the serial data output line 12D are connected.

In the conversion circuit $10_{41}$, among the switching means $35_1$ to $35_r$, the switching means achieving the logical value "1" of the pointer data $S37_1$ to $S37_r$ becomes the ON state, and the pixel data stored in the memories $36_1$ to $36_r$ are supplied to the serial data output line 12D. Namely, in synchronization with the logical value "1" being given to the pointer data S32 for only the first clock cycle of the horizontal duration and the pulse being given to the clock signal S31, as the serial data $S_{OUT}$, for example the processed pixel data of the pixels q(i,1) to q(i,r) of the i-th line are sequentially supplied to the serial data output line 12D.

Figure 10A:
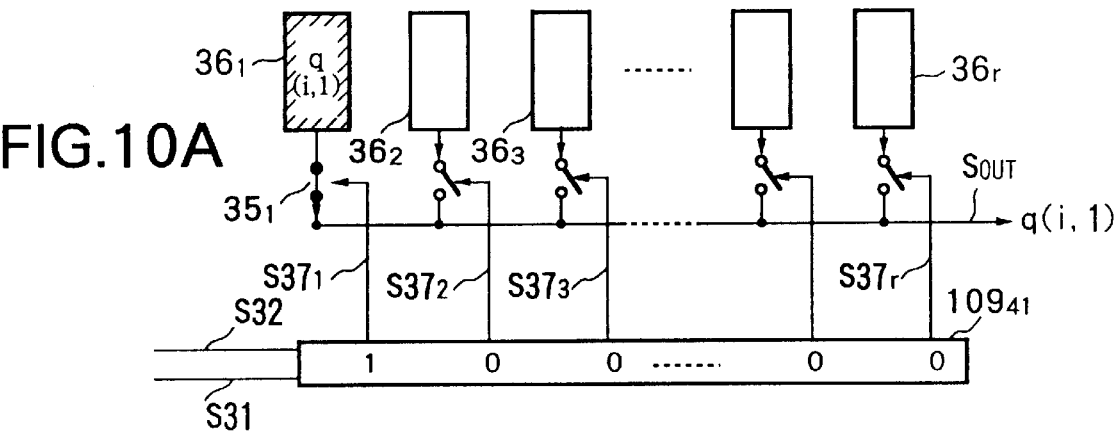
FIGS. 10A to 10C are views for explaining the operation of the data outputting means shown in FIG. 9.
Figure 10B:
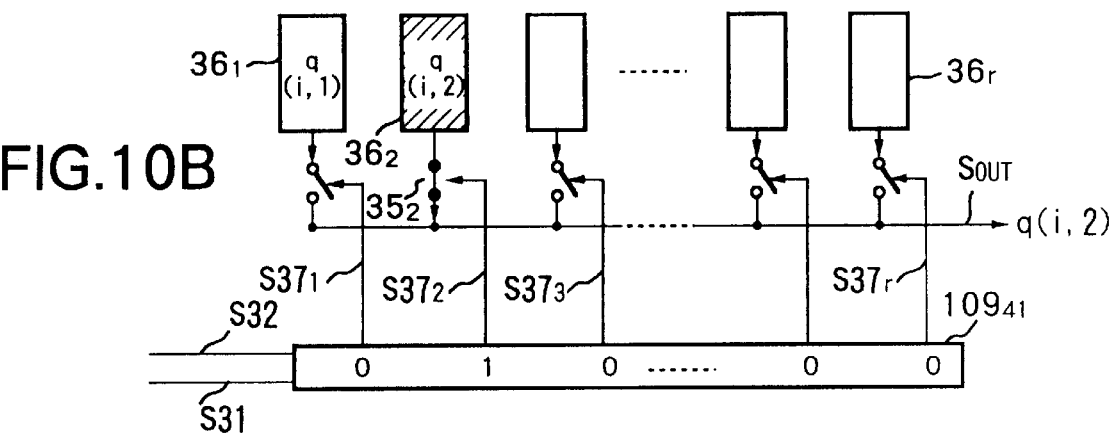

First, the pointer data $S37_1$ indicates the logical value "1", as shown in FIG. 10A, the switching means $35_1$ becomes the ON state, and the pixel data of the pixel q(i,1) is output. At this time, the pointer data $S37_2$ to $S37_r$ indicate the logical value "0", and the switching means $35_2$ to $35_r$ have become the OFF state. The pointer data $S37_2$ indicates the logical value "1", as shown in FIG. 1(B, the switching means $35_2$ becomes the ON state, and the pixel data of the pixel q(i,2) is output. At this time, the pointer data $S37_1$ and $S37_3$ to $S37_r$ indicate the logical value "0", and the switching means $35_1$ and $35_3$ to $35_r$ have become the OFF state.

The pointer data $S37_3$ to $S37_{r-1}$ sequentially indicate the logical value "1". After similar processing, the pixel data of pixels q(i,3) to q(i,r-1) are sequentially output.

Figure 10C:
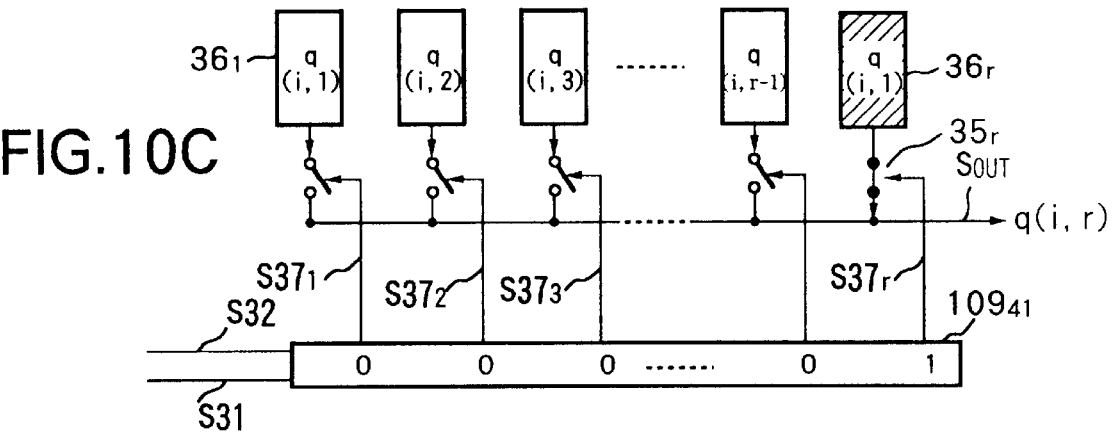

Finally, the pointer data $S37_r$ indicates the logical value "1". as shown in FIG. 10C, the switching means $35_r$ becomes the ON state, and the pixel data of the pixel q(i,r) is output.

The output signal of the unit delay element $37_r$ is output to the switching means $35_r$ and the R-terminal of the flip-flop $16_1$ as the pointer data, and the output level of the Q-terminal becomes the logical value "0".

The signal of the logical value "0" from the Q-terminal of the flip-flop $16_1$ is supplied as the control signal of the switch circuits $Z_{11}$ and $Z_{12}$ and makes the switch circuits $Z_{11}$ and $Z_{12}$ the OFF state. As a result, the clock signal input line 12C and the input terminal $FI_1$ are broken in connection, and the serial data output line 12D and the output terminal $EO_1$ are broken in connection.

Further, the output signal from the unit delay element of the last stage of the pointer circuit $109_{41}$ passes as the pointer data through the output terminal $GO_1$ and is supplied to the input terminal $GI_2$ of the data outputting means $4_2$ and the S-terminal of the flip-flop $16_2$.

By the pointer data input to the S-terminal of the flip-flop $16_2$, the Q-terminal outputs the signal of the logical value "1". The signal of the logical value "1" from this Q-terminal is supplied as the control signal of the switch circuits $Z_{21}$ and $Z_{22}$ and makes the switch circuits $Z_{21}$ and $Z_{22}$ the ON state. By turning on the switch circuit $Z_{21}$, the input terminal $FI_2$ of the data outputting means $4_2$ and the clock signal input line 12C are connected, and the clock signal S31 is supplied to the input terminal $FI_2$. By turning on the switch circuit $Z_{22}$, the output terminal $EO_2$ of the data outputting means $4_2$ and the serial data output line 12D are connected.

Then, at the data outputting means $4_2$, after similar processing to that of the data outputting means $4_1$ mentioned above, the pixel data of the pixels $q(i,r+1)$ to $q(i,2r)$ are sequentially output.

Processing similar to that mentioned above is carried out at the data outputting means $4_3$ and the flip-flop $16_3$ to the data outputting means $4_U$ and the flip-flop $16_U$, and serial data $S_{OUT}$ is output from the data output register 4.

When the logical value "1" is given to the pointer data S32 and the pulse is given to the clock signal S31 only for the first clock cycle of the horizontal sweep duration, the switching means $35_1$ to $35_n$ sequentially become the ON state only for one clock cycle in synchronization with this, and the pixel data stored in the memories $36_1$ to $36_n$ are output as the serial data $S_{OUT}$.

Specifically, when the pulse of one line's worth of pixels is given to the clock signal S31, for example the pixel data of pixels $q(i,1)$ to $q(i,n)$ of the i-th line are sequentially output as the serial data $S_{OUT}$ from the memories $36_1$ to $36_n$.

For example, in the above embodiment, where n=1,000, r=100, and Y=10, the number of the switching means connected to the serial data output line 12D is 110 or the sum of 10 of the switching means $Z_{12}$ to $Z_{102}$ and 100 of the switching means $35_1$ to $35_{100}$ in the data outputting means. On the other hand, in the parallel processor apparatus of the related art not constituting the data outputting means, the number of the switching means connected to the serial data output line 12D becomes 1,000 of the switching means $35_1$ to $35_{100}$ in the data output register. Accordingly, according to the parallel processor apparatus of the present invention, the number of the switching means connected to the serial data output line 12D can be decreased, and the static capacitance of the switching means parasitic to this serial data output line 12D can be reduced.

Accordingly the power consumption of the parallel processor apparatus when converting the parallel data $S3_1$ to $S3_n$ to the serial data $S_{OUT}$ can be reduced and, at the same time, the operating speed can be raised.

Further, in the present embodiment, the structure of supplying the clock signal to the data inputting means or the data outputting means having the pointer data is adopted, so the power consumption of the parallel processor apparatus can be reduced also in this point.

By constituting the detection circuit by using the flip-flop or charge-discharge circuit, in comparison with a case of detecting the time of input and the time of output of the pointer data to and from the data outputting means by providing the counter circuit for counting the pulses of the clock signal, a simpler circuit structure can be achieved. By making the number of the flip-flops or the number of the charge-discharge circuits the same as the number of the data outputting means, waste of the circuitry can be eliminated. Note that the U number of data inputting means and data outputting means are constituted by dividing the data input register 2 and the data output register 4 to the same number (U) of sections, but it is also possible to constitute different numbers of the data inputting means and data outputting means by dividing the data input register 2 and the data output register 4 into different number of sections.

Note also that while the above embodiment was an example of the present invention, the present invention is not limited to the embodiment.

Summarizing the effects of the invention, in the parallel processor apparatus of the present invention, by connecting the related data inputting means and the serial data input line for only the period from the time of input to the time of output of the pointer data to and from the data inputting means, in comparison with the case of the related art not constituting the data inputting means, the power consumption of the parallel processor apparatus when converting serial data to parallel data can be reduced and the operating speed can be raised.

In the parallel processor apparatus of the present invention, further, by connecting the related data outputting means and the serial data output line for only the period from the time of input to the time of output of the pointer data to and from the data outputting means, in comparison with the case of the related art not constituting the data outputting means, the power consumption of the parallel processor apparatus when converting parallel data to serial data can be reduced and the operating speed can be raised.

In the parallel processor apparatus of the present invention, further, by connecting the related data inputting means and the serial data input line for only the period from the time of input to the time of output of the pointer data to and from the data inputting means and connecting the related data outputting means and the serial data output line for only the period from the time of input to the time of output of the pointer data to and from the data outputting means, in comparison with the case of the related art not constituting the data inputting means and the data outputting means, the power consumption of the parallel processor apparatus when converting serial data to parallel data and converting parallel data to serial data can be reduced, and the operating speed can be raised.

What is claimed is:

1. A parallel processor apparatus comprising: data inputting means of a plurality of blocks each including a shift register having a plurality of first storage means connected in series so that pointer data is input to a first storage means of a first stage and so that the output of a first storage means of a previous stage is input to the first storage means of a latter stage, a plurality of second storage means provided corresponding to the plurality of first storage means, and a plurality of switching means provided corresponding to the plurality of first storage means and supply one partial data in a plurality of partial data constituting serial data to the corresponding ones of the plurality of second storage means at a timing corresponding to the output from the corresponding ones of the plurality of first storage means;

a plurality of processing means provided corresponding to the plurality of second storage means and performing processing using the partial data stored in the corresponding second storage means;

a plurality of detection circuits for detecting the input timing and output timing of pointer data in the data inputting means; and a switching circuit for connecting the data inputting means and serial data input line only in the period from the input to output of the pointer data detected by the detection circuit.

2. A parallel processor apparatus as set forth in claim 1, wherein:
   the detection circuit comprises a set-reset type flip-flop;
   the flip-flop is configured to make the output level of the flip-flop one level when the pointer data is input to the data inputting means and to make the output level of the flip-flop another level when the pointer data is output from the data inputting means; and
   the switch circuit connects the data inputting means and the serial data input line when the output level of the flip-flop is the one level.

3. A parallel processor apparatus as set forth in claim 1, wherein:
   the detection circuit is configured using a charge-discharge circuit which makes the output level one level by charging when the pointer data is input to the data inputting means and makes the output level another level by discharging when the pointer data is output from the data inputting means; and
   the switch circuit connects the data inputting means and the serial data input line when the output level of the charge-discharge circuit is the one level.

4. A parallel processor apparatus as set forth in claim 1, wherein the number of the detection circuits is equal to the number of the data inputting means.

5. A parallel processor apparatus as set forth in claim 1, wherein:
   the serial data is image data and
   the partial data is image data.

6. A parallel processor apparatus comprising:
   a plurality of processing means;
   data outputting means of a plurality of block each including a shift register having a plurality of first storage means connected in series so that pointer data is input to a first storage means of a first stage and so that the output of the first storage means of a previous stage is input to the first storage means of a latter stage, a plurality of second storage means provided corresponding to the plurality of processing means and receiving as input and storing the results of processing from the corresponding processing means, and a plurality of switching means provided corresponding to the plurality of first storage means and supplying the results of processing from the corresponding ones of the plurality of second storage means at a timing corresponding to the output form the corresponding ones of the plurality of first storage means;
   a detection circuit for detecting the input timing and output timing of pointer data in the data outputting means; and
   a switching circuit for connecting the data outputting means and serial data output line only in the period from the input to output of the pointer data detected by the detection circuit.

7. A parallel processor apparatus as set forth in claim 6, wherein:
   the detection circuit comprises a set-reset type flip-flop;
   the flip-flop is configured to make the output level of the flip-flop one level when the pointer data is input to the data outputting means and to make the output level of the flip-flop another level when the pointer data is output from the data outputting means; and
   the switch circuit connects the data outputting means and the serial data output line when the output level of the flip-flop is the one level.

8. A parallel processor apparatus as set forth in claim 6, wherein:
   the detection circuit is configured using a charge-discharge circuit which makes the output level one level by charging when the pointer data is input to the data outputting means and makes the output level another level by discharging when the pointer data is output from the data outputting means; and
   the switch circuit connects the data outputting means and the serial data output line when the output level of the charge-discharge circuit is the one level.

9. A parallel processor apparatus as set forth in claim 6, wherein the number of the detection circuits is equal to the number of the data outputting means.

10. A parallel processor apparatus as set forth in claim 6, wherein:
    the serial data is image data and
    the partial data is image data.

11. A parallel processor apparatus comprising:
    data inputting means of a plurality of blocks each having a shift register including a plurality of first storage means connected in series so that first pointer data is input to a first storage means of a first stage and so that the output of a first storage means of a previous stage is input to the first storage means of a latter stage, a plurality of second storage means provided corresponding to the plurality of first storage means, a plurality of first switching means providing corresponding to the plurality of first storage means and supplying one partial data in a plurality of partial data constituting serial data to the corresponding ones of the plurality of second storage means at a timing corresponding to the output from the corresponding first storage means:
    a plurality of processing means providing corresponding to the plurality of second storage means and for performing processing using the partial data stored in the corresponding ones of the plurality of second storage means;
    data outputting means of a plurality of blocks each comprising a shift register including a plurality of third storage means connected in series so that second pointer data is input to a third storage means of a first stage and so that the output of a third storage means of a previous stage is input to the third storage means of a latter stage, a plurality of fourth storage means provided corresponding to the plurality of processing means and receiving as input and storing the results of processing from the corresponding processing means, and a plurality of second switching means provided corresponding to each of the plurality of third storage means and outputting the results of processing from the corresponding ones of the plurality of fourth storage means to the serial data output line at a timing corresponding to the output from the corresponding ones of the plurality of third stage means to generate serial data;
    a first detection circuit for detecting the input timing and output timing of the first pointer data at the data inputting means;
    a first switching means for connecting the data inputting means and serial data input line only in the period from the input to output of the first pointer data detected by the first detection circuit;
    a second detection circuit for detecting the input timing and output timing of the second pointer data at the data outputting means; and a second switching means for connecting the data outputting means and serial data output line only in the period from the input to output of the second pointer data detected by the second detection circuit.

12. A parallel processor apparatus as set forth in claim 11, wherein:
the first detection circuit comprises a set-reset type first flip-flop;
the first flip-flop is configured to make the output level of the first flip-flop one level when the first pointer data is input to the data inputting means and to make the output level of the first flip-flop another level when the first pointer data is output from the data inputting means;
the second detection circuit comprises a set-reset type second flip-flop;
the first switch circuit connects the data inputting means and the serial data input line when the output level of the first flip-flop is the one level;
the second flip-flop is configured to make the output level of the second flip-flop one level when the second pointer data is input to the data inputting means and to make the output level of the second flip-flop another level when the second pointer data is output from the data inputting means; and
the second switch circuit connects the data outputting means and the serial data output line when the output level of the second flip-flop is the one level.

13. A parallel processor apparatus as set forth in claim 11, wherein:
the first detection circuit is configured using a first charge-discharge circuit which makes the output level one level by charging when the first pointer data is input to the data inputting means and makes the output level another level by discharging when the first pointer data is output from the data inputting means;
the first switch circuit connects the data inputting means and the serial data input line when the output level of the first charge-discharge circuit is the one level;
the second detection circuit is configured using a second charge-discharge circuit which makes the output level one level by charging when the second pointer data is input to the data inputting means and makes the output level another level by discharging when the second pointer data is output from the data inputting means; and
the second switch circuit connects the data outputting means and the serial data output line when the output level of the second charge-discharge circuit is the one level.

14. A parallel processor apparatus as set forth in claim 11, wherein
the number of the first detection circuits is equal to the number of the data inputting means and
the number of the plurality of the second detection circuits is equal to the number of the data outputting means.

15. A parallel processor apparatus as set forth in claim 11, wherein
the serial data is image data and
the partial data is image data.

* * * * *